United States Patent [19]
Arai et al.

[11] Patent Number: 4,937,686
[45] Date of Patent: Jun. 26, 1990

[54] METHOD AND APPARATUS FOR PCM RECORDING AND REPRODUCING AN AUDIO SIGNAL HAVING AN ASYNCHRONOUS RELATION BETWEEN THE SAMPLING FREQUENCY FOR THE AUDIO SIGNAL AND THE ROTATION FREQUENCY OF A ROTARY HEAD SCANNER

[75] Inventors: Takao Arai; Masaharu Kobayashi; Nobutaka Amada; Yasufumi Yumde; Hiroaki Takahashi, all of Yokohama, Japan

[73] Assignee: Hitachi, Ltd., Tokyo, Japan

[21] Appl. No.: 929,909

[22] Filed: Nov. 13, 1986

[30] Foreign Application Priority Data

| Nov. 13, 1985 | [JP] | Japan | 60-252740 |
| Nov. 13, 1985 | [JP] | Japan | 60-252741 |
| Nov. 13, 1985 | [JP] | Japan | 60-252742 |
| Jan. 13, 1986 | [JP] | Japan | 61-3429 |
| Jan. 22, 1986 | [JP] | Japan | 61-10054 |

[51] Int. Cl.⁵ .................................................. G11B 5/09
[52] U.S. Cl. ........................................................ 360/32
[58] Field of Search ................... 360/8, 32, 51, 19.1; 340/347 M

[56] References Cited

U.S. PATENT DOCUMENTS

| 4,206,476 | 6/1980 | Hashimoto | 360/32 |
| 4,492,989 | 1/1985 | Watanabe et al. | 360/32 |
| 4,562,488 | 12/1985 | Koyama et al. | 360/8 |
| 4,617,599 | 10/1986 | Noguchi et al. | 360/51 |
| 4,620,238 | 10/1986 | Gaskell et al. | 360/8 |
| 4,646,171 | 2/1987 | Odaka et al. | 360/32 |
| 4,660,103 | 4/1987 | Wilkinson et al. | 360/19.1 |
| 4,719,521 | 1/1988 | Juso | 360/32 |

FOREIGN PATENT DOCUMENTS

| 0137855 | 4/1985 | European Pat. Off. . |
| 0142613 | 5/1985 | European Pat. Off. . |
| 0146773 | 7/1985 | European Pat. Off. . |
| 0155664 | 9/1985 | European Pat. Off. . |

OTHER PUBLICATIONS

SMPTE Journal, vol. 91, No. 12, 12-1982, "Editing Digital Audio Signals to a Digital/Audio Video System", pp. 1158-1160.
AES, Oct. 8-11, 1984, Shelton, "Signal Synchronization in Digital Audio".

Primary Examiner—Vincent P. Canney
Attorney, Agent, or Firm—Antonelli, Terry, Stout & Kraus

[57] ABSTRACT

A PCM audio signal recording and reproducing apparatus samples an audio signal with a sampling frequency having an asynchronous relation to a field frequency of a video signal; converts it to a PCM signal, adds error detection/correction data to a predetermined number of PCM data, forms a data frame by those signals, modulates it in accordance with a predetermined modulation system, and records the audio signal together with the video signal or just the audio signal on a record medium by using a rotary head type scanner which is controlled so as to have a synchronous relation to the field frequency of the video signal. A digital signal processing circuit having a memory of a predetermined capacity is provided, and the number of digital data to be recorded in one data frame is varied in accordance with a difference between the number of input data of the digital audio signal to the digital signal processing circuit and the number of output data supplied to the record medium for recording. In the recording mode, the PCM audio signal is sectioned into blocks, a data block address signal is added to each block to indicate a relative order of a block to the other blocks and is completely added in one track, certain number of blocks are combined to form a block set for processing signals, and an identification signal completing in the block and an interleave block address signal for indicating a relative order to other blocks are added to each block.

12 Claims, 25 Drawing Sheets

FIG. 13

| MODE | 1 | 2 | 3 | 4 |
|---|---|---|---|---|
| NUMBER OF AUDIO SIGNALS | 2 | 2 | 4 | 2 |
| SAMPLING FREQUENCY | 48KHz | 32KHz | 32KHz | 44.1KHz |
| NUMBER OF QUANTIZATION | 16 | 16 | 12 | 16 |
| NUMBER OF STANDARD DATA IN FRAME | 2880 | 1920 | 2880 | 2646 |

| | | | | | | | | | |
|---|---|---|---|---|---|---|---|---|---|
| 74— | DATA BLOCK ADDRESS | 0 | X | X | X | X | X | 0 | 0 |
| 78— | ID SIGNAL | 1 | OPTION CODE | | ID-1 | | ID-2 | | |
| 75— | DATA BLOCK ADDRESS | 0 | X | X | X | X | X | 0 | 1 |
| 79— | ID SIGNAL | 1 | OPTION CODE | | ID-3 | | ID-4 | | |
| 76— | DATA BLOCK ADDRESS | 0 | X | X | X | X | X | 1 | 0 |
| 80— | ID SIGNAL | 1 | OPTION CODE | | ID-5 | | ID-6 | | |
| 77— | DATA BLOCK ADDRESS | 0 | X | X | X | X | X | 1 | 1 |
| 81— | ID SIGNAL | 1 | OPTION CODE | | ID-7 | | ID-8 | | |

MSB                LSB

MSB           LSB

| 0 | 0 | 0 | 0 | 0 | 0 | 0 | 0 | 0 |
| 0 | 0 | 0 | 0 | 0 | 0 | 0 | 1 | 1 |
| 0 | 0 | 0 | 0 | 0 | 0 | 1 | 0 | 2 |
| 0 | 0 | 0 | 0 | 0 | 0 | 1 | 1 | 3 |
| 0 | 0 | 0 | 0 | 0 | 1 | 0 | 0 | 4 |
| 0 | 0 | 0 | 0 | 0 | 1 | 0 | 1 | 5 |
| | | | | | | | | |
| 0 | 1 | 1 | 1 | 1 | 1 | 1 | 1 | 127 |

FIG. 27

|  | W1 (69) | | | W2 (70) | | | | | | | |
|---|---|---|---|---|---|---|---|---|---|---|---|
| 69-1 | ID-1 | ID-2 | (FRAME ADDRESS) | 0 | X | X | X | X | 0 | 0 | 0 |
| 69-2 | DATA BLOCK ADDRESS | | | 0 | X | X | X | X | 0 | 0 | 1 |
| 69-3 | ID-3 | ID-4 | (FRAME ADDRESS) | 0 | X | X | X | X | 0 | 1 | 0 |
| 69-4 | DATA BLOCK ADDRESS | | | 0 | X | X | X | X | 0 | 1 | 1 |
| 69-5 | ID-5 | ID-6 | (FRAME ADDRESS) | 0 | X | X | X | X | 1 | 0 | 0 |
| 69-6 | DATA BLOCK ADDRESS | | | 0 | X | X | X | X | 1 | 0 | 1 |
| 69-7 | ID-7 | ID-8 | (FRAME ADDRESS) | 0 | X | X | X | X | 1 | 1 | 0 |
| 69-8 | DATA BLOCK ADDRESS | | | 0 | X | X | X | X | 1 | 1 | 1 |

MSB        LSB MSB        LSB

METHOD AND APPARATUS FOR PCM RECORDING AND REPRODUCING AN AUDIO SIGNAL HAVING AN ASYNCHRONOUS RELATION BETWEEN THE SAMPLING FREQUENCY FOR THE AUDIO SIGNAL AND THE ROTATION FREQUENCY OF A ROTARY HEAD SCANNER

BACKGROUND OF THE INVENTION

The present invention generally relates to the recording and reproducing of a PCM audio signal, and more particularly to a method and apparatus for recording and reproducing a coded audio signal together with a video signal or singly to and from a magnetic tape by a rotary magnetic head type scanner, and still more particularly to a method and apparatus for recording and reproducing a PCM audio signal which is suitable when a sampling frequency for the PCM audio signal and a rotation frequency of the scanner are asynchronous.

The recording and reproducing of a PCM audio signal has been adopted in order to improve the quality of an audio signal accompanied with a video.

For example, an 8 mm video recorder adopts an audio PCM system. A sampling frequency of the audio PCM signal is two times as high as a repetition frequency of a horizontal synchronization signal. It is different from an internationally common sampling frequency (32 kHz, 44.1 kHz or 48 kHz). For example, a sampling frequency of an audio PCM signal in a satellite broadcast is 32 kHz or 48 kHz.

On the other hand, in a MUSE system which is one of transmission systems for a high grade television system, the sampling frequency of the audio PCM signal is 32 kHz or 48 kHz. Thus, if data sampled at the above sampling frequency are to be recorded field by field, the number of data per field includes a fraction In order to resolve this problem, a packet transmission system having a leap field to absorb the excess has been adopted as disclosed in NHK Technical Journal 27-7, page 282.

In a video disk, the PCM audio signal is recorded at the sampling frequency of 44.1 kHz with the same format as that of a compact disk.

However, when the PCM signal is to be recorded by an apparatus such as a video tape recorder which records or transmits the signal discontinuously in time, the following problems arise. First, when a field frequency of a video signal is not an integer multiple of the sampling frequency of the audio signal, the problem described above is encountered in coding. While a solution such as the MUSE system described above has been proposed, there must be a synchronous relationship between the field frequency fv of the video signal or a rotation frequency $f_D$ of a head scanner which rotates synchronously with the field frequency, and the sampling frequency $f_s$ of the video signal. This imposes a limitation to a system application range.

As an apparatus for PCM recording and reproducing only the audio signal by a rotary head type VTR, a consumer PCM encoder/decoder (registered in Sept. 1983) of the Japanese Electronic Industries Association Technical Standard CPZ-105 has been known. A recording and reproducing apparatus in accordance with the above Technical Standard is disclosed in an article "Digital Audio/Video Combination Recorder Using Custom Made LSI's, IC's" presented at the 69th Convention, 1981 May 12-15, Los Angles AES 1791 (B-6), particularly FIGS. 1 and 14. In this article, in the NTSC system, the field frequency $f_v$ and the sampling frequency $f_s$ are divided from the same master clock and they have a relationship of $f_s = 735 f_v$. Accordingly, the number of samples per field is constant at 735.

FIG. 1 of the above article shows a block diagram of a configuration of an apparatus for recording and reproducing sampled PCM signals. An address of a RAM which serves as an interleaving memory is controlled by an address control circuit.

However, when the PCM audio signal is to be recorded together with a video signal by a rotary head helical scan type VTR, and if the video signal is of 525 lines/60 fields Television system, the field frequency ($f_v = 59.94$ Hz) is not an integer multiple of the sampling frequency ($f_s = 32$ kHz, 48 kHz), and the number of blocks per field includes a fraction.

As a result, a block set which is an aggregation of a predetermined number of blocks for processing the signal such as interleaving and deinterleaving is separated between the fields, inconveniently.

A rotary head type digital audio type recorder (R-DAT) for recording only the audio signal has been known and a portion of its specification has been published by "Technical Standard of Rotary Head System (R-DAT)", Dempa Shimbun, Oct. 7, 1985, page 48.

In each of the above cases, it is assumed that the field frequency $f_v$ and the sampling frequency $f_s$ have a certain relationship and there is no discussion for a case where $f_v$ and $f_s$ are not correlated.

In the prior art techniques described above, the sampling frequency of the video signal is not the internationally common sampling frequency, the number of quantized bits is small, and the sampling frequency of the audio signal and the field frequency have a synchronized relationship. Thus, when a video signal from a camera and a digital signal from a compact disk are to be recorded together, it is very difficult to simultaneously record them because the sampling frequencies are different and there is no synchronous relationship between the sampling frequency and the field frequency.

A solution to the above problem has been proposed in British Patent Application No. 423452 field on Sept. 17, 1984 (JP-A-61-73207). Since it has not been published before the present invention, it is not cited herein as prior art.

SUMMARY OF THE INVENTION

It is an object of the present invention to provide a video tape recorder and digital/audio signal processing method and apparatus which can record and reproduce a digital audio signal of an internationally common sampling frequency under a video field frequency which is not synchronous with the sampling frequency.

The above object is achieved by controlling the number of samples (number of data) recorded in each field in accordance with a ratio of the field frequency and the audio signal sampling frequency. The control is done by increasing or decreasing the number of data in each data frame which is a basic unit for data processing, in accordance with the detected ratio.

In accordance with one feature of the present invention, an input sampling signal is temporarily stored in a memory in a recorder unit, it is encoded in a predetermined manner and interleaved, and then sequentially read from the memory to form a signal to be recorded on a tape. A write frequency to the memory depends on the input sampling signal frequency and a readout frequency depends on the video signal field frequency.

Thus, the number of data stored in the memory depends on the sampling signal frequency and the video signal field frequency. For example, if the input sampling signal period is shortened, the number of stored data increases, and if the period is lengthened, the number of stored data decreases. On the other hand, if the field period is shortened, the number of stored data decreases, and if the field period is lengthened, the number of stored data increases. Accordingly, by adjusting the number of sampled signals in each field in accordance with a difference between an input data address and an output data address of the memory, that is, increasing the number of data as the address difference increases, different input sampling signal periods can be rendered to comply with the field signal period.

In accordance with another feature of the present invention, with regard to signal recording, the PCM audio signal is sectioned into blocks. A data block address signal is added to each block to indicate a relative order of a block to the other blocks, and an interleave block address signal is added to each of the blocks in a block set which comprises a predetermined number of blocks. The data block address signal and the interleave block address signal are provided for effecting a signal processing such as interleaving and deinterleaving to indicate a relative order of a block to other blocks. A block processing is completed in a period synchronized with the sampling frequency, and the interleave block address signal and an identification signal are added to alternate blocks.

In the data processing method for generating the above format, each block generated at the end of signal recording has data block address signals, the interleave block signal completed in the block set including the predetermined number of blocks for effecting the signal processing such as interleaving, and the identification signal.

In the reproduction mode, the recorded signal is processed field by field by the data block address signal, and the signal processing such as deinterleaving is effected the interleave block address signal and the identification signal. Accordingly, no malfunction occurs even if the number of blocks recorded in one field is different from field to field. The present method is suitable for the case where the audio signal sampling frequency is not synchronous with the video signal field frequency or the rotary-head rotation frequency.

BRIEF DESCRIPTION OF THE DRAWINGS

FIG. 13 shows an audio signal specification, FIG. 25 shows a format of data block address signal and identification signal $W_1$ of FIG. 24, FIG. 26 shows a format of interleave address signal $W_2$ of FIG. 24, FIG. 27 shows other examples of formats of $W_1$ and $W_2$ of FIG. 24.

DESCRIPTION OF THE PREFERRED EMBODIMENTS

One embodiment of the present invention is now explained with reference to FIG. 1.

Figure 1:
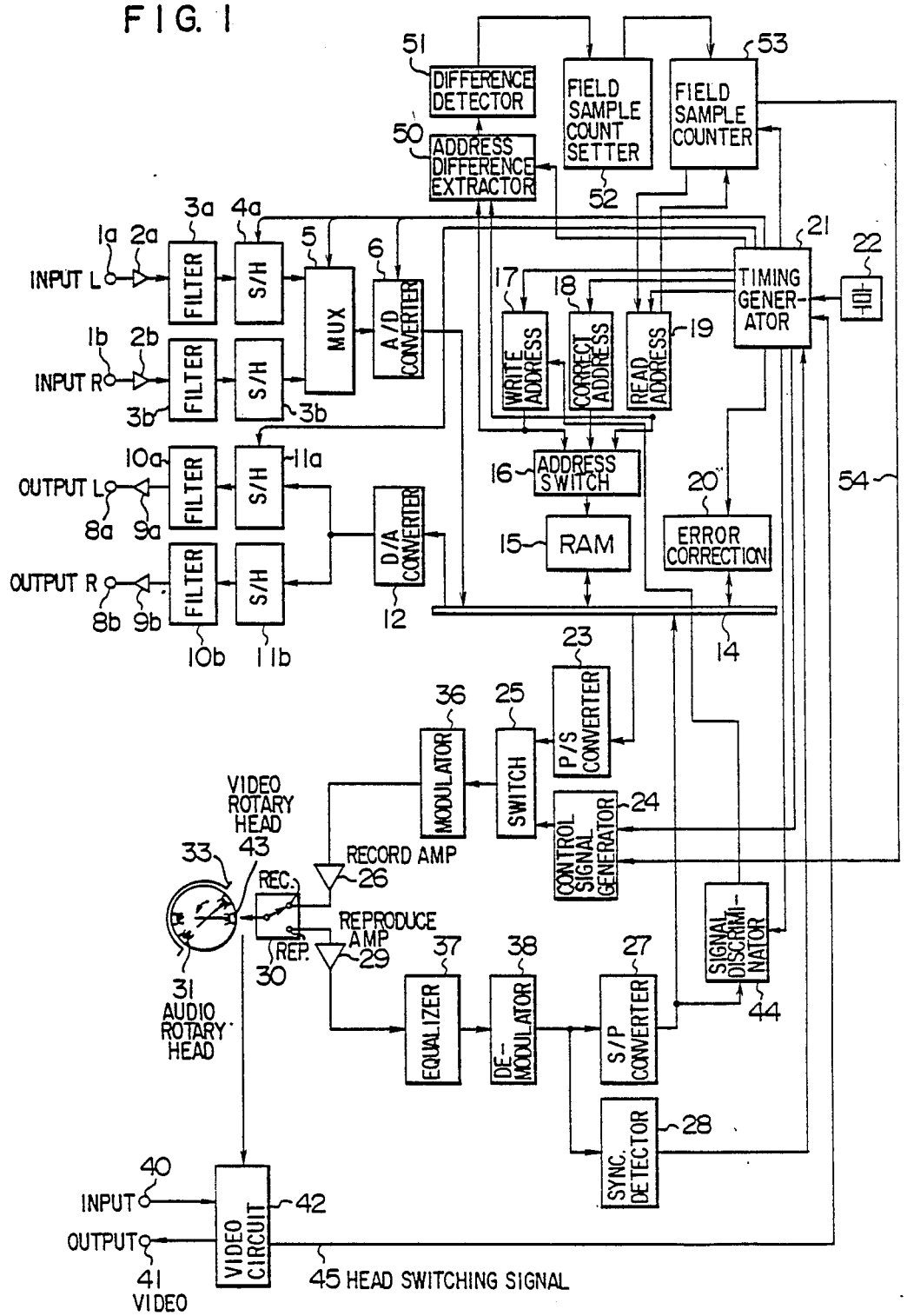
FIG. 1 is a block diagram of a configuration of one embodiment of a PCM signal recording and reproducing apparatus of the present invention.

FIG. 1 shows a configuration of a rotary head type PCM signal recording and reproducing apparatus.

In a recording mode, two channels (L, R) of analog signals are applied to input terminals 1 (1a, 1b). The input signals are amplified to a predetermined level by amplifiers 2 (2a, 2b), band-limited by filters 3 (3a, 3b) and sampled by sample-hold circuits 4 (4a, 4b). The sampled input signals are sequentially supplied by a multiplexor 5 to an A/D converter 6 where they are converted to PCM signals. The PCM signals converted by the A/D converter 6 are written into a RAM 15 through a bus line 14. An address of the RAM 15 is controlled by address generators 17–19 and an address switching circuit 16 so that the PCM signals are arranged in a predetermined format and an error correction code is generated and added. The error correction code is generated and added by an error correction circuit 20. After the arrangement of the PCM signals and the addition of the error correction code, the data is sequentially read from the RAM 15. A read address generator 19 is controlled to assure that the number of audio signal samples in one field counted by a field sample counter 53 is equal to the number of samples preset in a field sample count setter 52 based on a difference between a write address and a read address extracted by an address difference extract circuit 50 and detected by a difference detect circuit 51. The signals read from the RAM 15 are converted to a serial signal by a parallel-serial converter. 23. If the number of audio signals in one field is small, a signal other than the audio signal and control signals such as a code for indicating the audio-signal or non-audio signal and a synchronization signal are added by a control signal generator 24 and a switching circuit 25, and the data is modulated by a modulator 36. The modulated data is amplified to a predetermined level by a recording amplifier 26 and it is recorded on a surface or a deep layer of a magnetic tape 33 by an audio rotary head 31. A switching circuit 30 switches between the recording mode and the reproducing mode. A timing signal generator 21 generates timing signals to control an overall system by clocks generated by an oscillator 22.

In the reproducing mode, the switching circuit 30 selects the reproducing mode and the signal reproduced by the audio rotary head 31 is amplified to a predetermined level by a reproducing amplifier 29 and the output thereof is equalized by a waveform equalizer 37. The equalized signal is demodulated by a demodulator 38 into a digital signal. The demodulated digital signal is detected for synchronization signal by a synchronization detector 28 and converted to parallel signals by a serial-parallel converter 27. The detected synchronization signal is used as a reference for data reproduction. The parallel converted data is checked for audio signals or non-audio signals by a signal discriminator 44 and only the audio signals are stored in the RAM 15 or the audio signals and the non-audio signals is stored in the RAM 15, and the data are rearranged and error detection and correction are done by the error correction circuit 20. The data are than supplied to a D/A converter 12 through the bus line 14 where they are sequentially converted to analog signals, which are resampled for each channel by sample-hold circuits 11 (11a, 11b). The resampled analog signals of the respective channels are outputted from output terminals 8 (8a, 8b) through filters 10 (10a, 10b) and amplifiers 9 (9a, 9b).

In the recording mode, a video signal is applied to an input terminal 40, converted to a predetermined signal by a video circuit 42, and it is recorded on the tape 33 by a video rotary head 43. In the reproducing mode, the signal reproduced by the video rotary head 43 is converted to a predetermined signal by the video circuit 42 and it is outputted from an output terminal 41.

Figure 2:
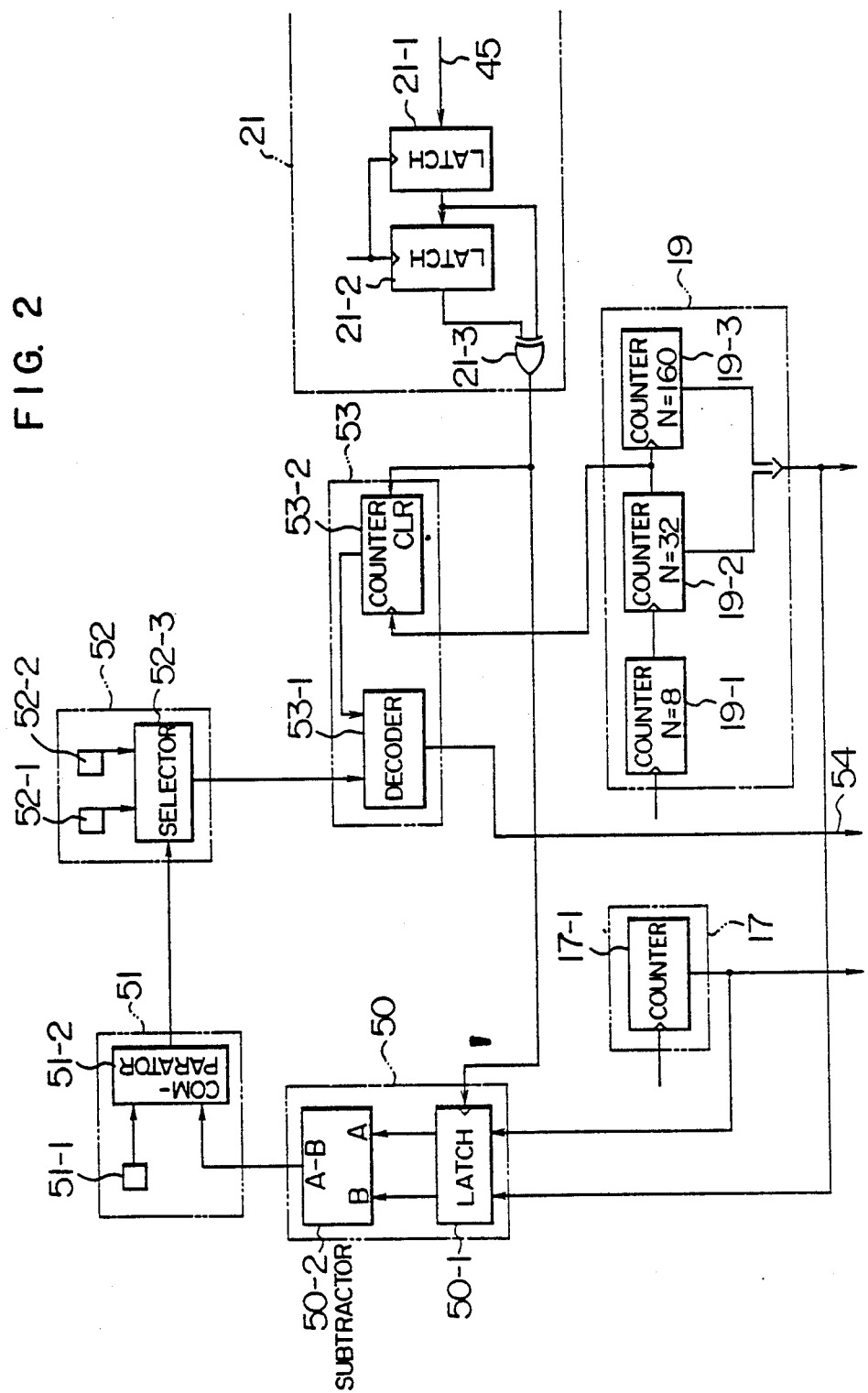
FIG. 2 is a block diagram of a configuration of a memory address circuit in the apparatus of FIG. 1.

A specific configuration of the present embodiment is explained with reference to FIG. 2. FIG. 2 shows a circuit configuration of RAM write and read address circuits in the recording mode. A write address circuit 17 comprises a counter 17-1. A read address circuit 19 comprises a counter 19-1 which divides a master clock by eight, a counter 19-2 which divides the ⅛ frequency-divided output by 32 and a counter 19-3 which divides the 1/32 frequency-divided output by 160 for a VTR of 525 lines/60 field (NTSC) and by 192 for a VTR of 625 lines/50 field (PAL).

A latch 50-1 of the address difference extract circuit 50 latches the output of the write address circuit 17 and the output of the read address circuit 19 at a transition point of a head switching signal 45 extracted by an exclusive OR gate 21-3. The latched output is supplied to a subtractor 50-2. A difference between the read address and the write address together with an output of a discrimination circuit 51-1 are supplied to a comparator 51-2 which compares it with the output of the discrimination circuit 51-1. The field sample counter 52 controls a selector 52-3 which selects a counter predetermined sample number per field deciding value 52-1 or 52-2, in accordance with the output of the comparator 51-2 to set the field sample count. Namely, the decoder 53-1 is set such that if the output of the subtractor 50-2 is larger than the output of the discrimination circuit 51-1, the number of audio data is increased, and if the output of the subtractor 50-2 is smaller than the output of the discrimination circuit 51-1, the number of audio data is reduced. If the output of the counter 53-2 is equal to the decoded value selected by the selector 52-3, the field sample counter 53 records "0" for the audio signal and "1" for the non-audio signal in the control code area by a signal 54 which controls the control signal circuit 24.

Figure 3:
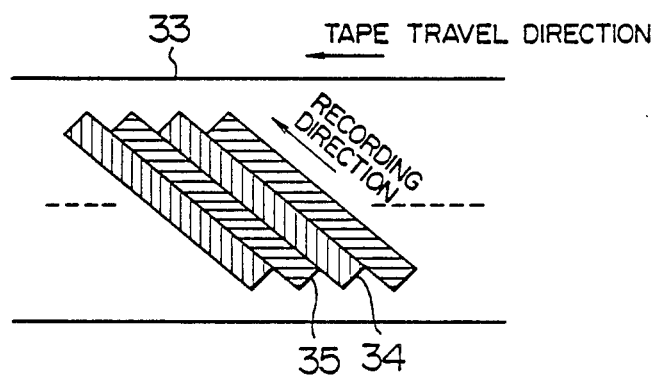
FIG. 3 shows a pattern recorded on a magnetic tape.

FIG. 3 shows a recorded pattern on a magnetic tape. A + azimuth track 34 and a − azimuth track 35 are alternately recorded on the magnetic tape 33. A video signal and an audio signal are recorded in a surface layer or separately in the surface layer and a deep layer on each track. Alternatively, only the audio signal is recorded in the surface layer or the surface layer and the deep layer.

A data arrangement when a VTR is used as a rotary head type PCM signal recording and reproducing apparatus is explained below.

When an audio signal having a sampling frequency of 48 kHz and quantizing bits of 16 is to be recorded, each field comprises 800.8 samples because a cylinder rotation speed of the VTR is approximately 1798.2 rpm. Accordingly, it is necessary that the number of samples in one field period be 800, 801 or other number so that the numbers of data are equal among a plurality of fields.

Figure 4:
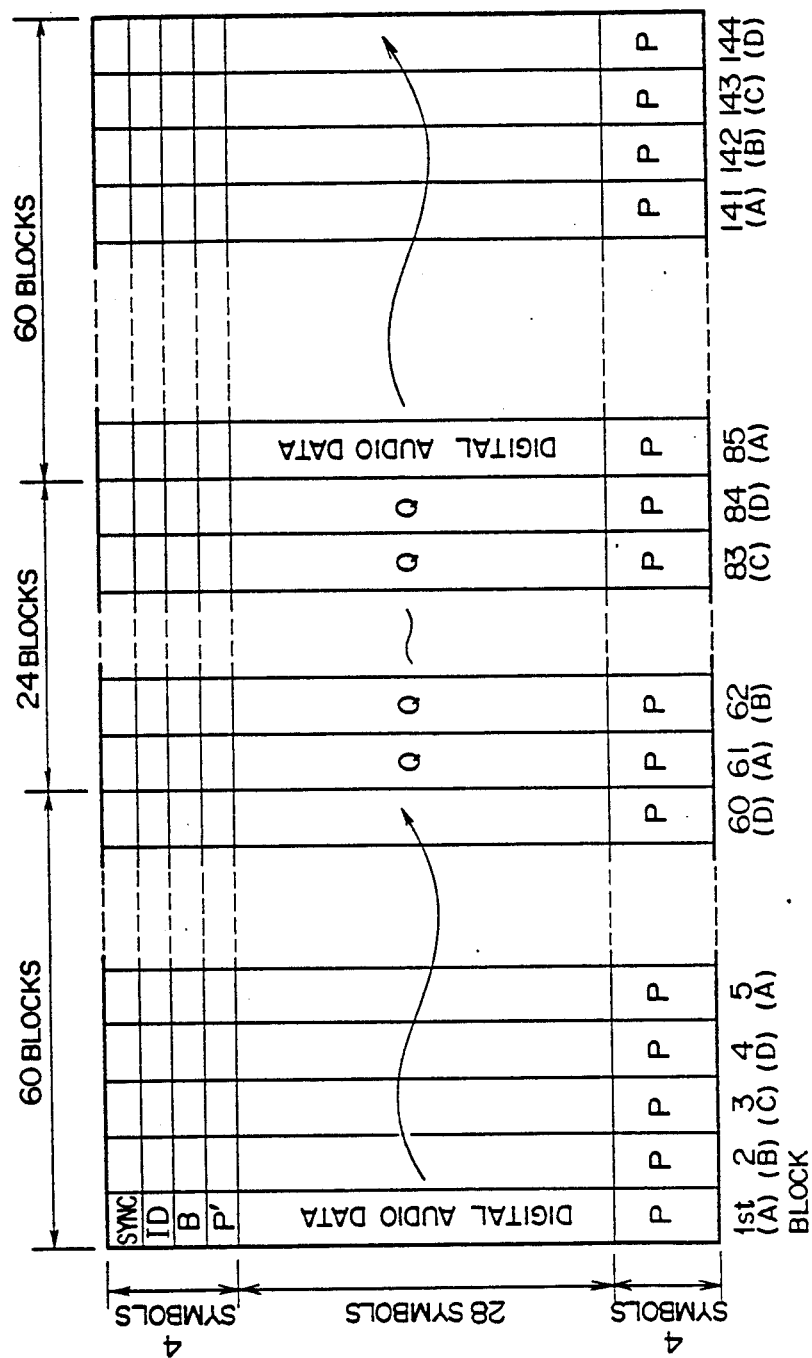
FIGS. 4–7 show one-field data formats.

Let us consider a one-field data format which substantially complies with a format of a rotary head digital audio tape recorder (R-DAT). In FIG. 4, a 2-channel one-word 16-bit PCM signal is divided into 8-bit symbols, and each block is generated which comprises 28 data or parity symbols, and 4 symbols for a synchronization signal, an ID code including a control signal indicating the type of data, a block addresses B and a parity P' for error detection. For example, 160 blocks for the 525/60 (NTSC) system or 190 blocks for the 625/50 (PAL) system are recorded on each track. An error correction code is added and the data is distributed so that an error can be corrected for a large burst error. As an example of distribution, even-numbered data are recorded in a front half of the track and odd-numbered data are recorded in a rear half of the track.

One block includes 28 symbols of digital audio data or 14 words. Accordingly, in order to record 800.8 words ×2 per field of the L and R channels, that is, 3203.2 symbols of data, it is necessary to record at least 114 blocks or 115 blocks in one field.

FIG. 4 shows a data format per field which is based on the above consideration. In FIG. 4, each consists of 144 blocks. For a sake of convenience of explanation, the blocks are numbered by 0 to 143 in the order of recording on the record medium. Digital audio data are recorded on the first to 60th blocks, a parity signal of an error correction code is included in the following 24 blocks, that is, the 61st to 84th blocks, and digital audio data are again recorded on the 85th to 144th blocks. A block address signal in each block indicates the order of the block in a total of 144 blocks which constitute one field. Of the symbols which constitute one block, the 32 symbols excluding the first 4 symbols, that is, the synchronization signal S, the ID code I, the block address signal B and the parity code P' are stored in the interleave/deinterleave memory in the system as shown in FIG. 4 in the recording mode and the reproducing mode. They are sent to the record medium starting from the first block or reproduced from the record medium The digital data Q recorded from the 61st block to the 84th block is generated in the following manner. The Q is a parity code for detecting and correcting errors, in the reproducing mode, of the digital audio data recorded on the other blocks. It may be generated by using (36, 30, 7) Reed-Solomon (RS) code. FIG. 4 illustrates the generation of the parity code. In FIG. 4, the 144 blocks which constitute one field are sequentially sectioned into A, B, C, and D starting from the first block. The first 60 digital audio data blocks, the intermediate 24 parity signal blocks and the last 60 digital audio data blocks are multiples of four. The number of blocks belonging to A is 144/4 =36 blocks, of which 30 blocks have the digital audio data recorded thereon and the remaining 6 blocks have the error detection/correction parity signal recorded thereon for the errors generated in the above 30 blocks. Similarly, the parity signals are generated based on the digital audio data belonging to B, C and D.

In this manner, the data format in one field is defined. As described above, in the 525/60 (NTSC) system, the 48 kHz sampled 16-bit quantized data has 800.8 words per field period and 1601.6 symbols or 3202.2 symbols for L and R channels are transmitted. On the other hand, in the data format in one field period shown in FIG. 4, the number of data recorded in one field is 28 symbols ×120 =3360 symbols and the data corresponding to 157.8 symbols or approximately 5.6 blocks are excess records.

Figure 5:
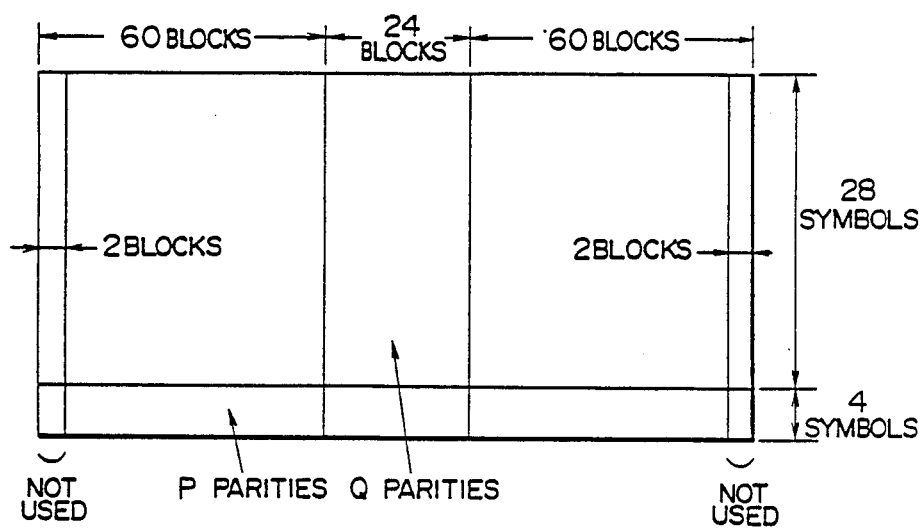
Figure 6:
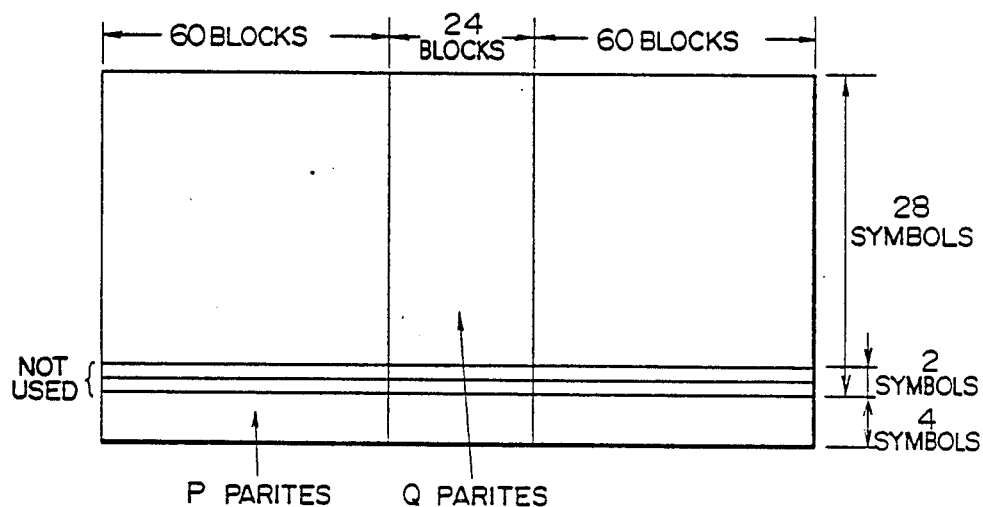

FIG. 5 shows one field by block. The first and second blocks and the 119th and 120th blocks are shown as non-used blocks. In FIG. 6, all 120 blocks are used but 26 symbols of the digital audio data in each block are used and the 27th and 28th symbols are not used as data areas. In this case, the number of data in one field may be 26 symbols ×120 blocks =3120 symbols.

In this manner, the number of data in one field may be changed in accordance with the designation of the data area to be used. The areas which are not used as the data areas may be used to record the data other than the digital audio signals (sub-codes).

If the number of data in one field is set to be significantly larger than 800.8 samples per channel of the L or R channel, greater errors of the VTR vertical synchronization signal and the sampling frequency can be absorbed. A more adaptive control is attained by controlling the number of samples in one field in accordance with the output magnitude of the address difference extract circuit 50.

Figure 7:
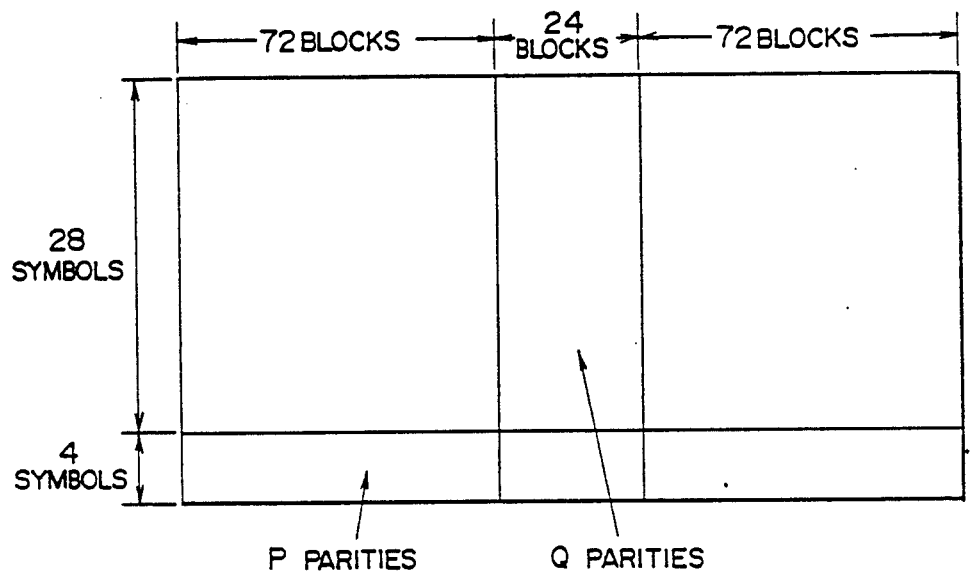

The application of the present invention to the 525/60 (NTSC) system has been described. A similar advantage is attained in the 625/50 (CCIR; PAL) system television signal VTR in accordance with the teaching of the present invention. In the 625/50 system, the number of blocks per field is 168 blocks as shown in FIG. 7. Like in the 525/60 system, P parities are added to each block, and 168 blocks consisting of 144 data blocks and 24 Q parity blocks constitute one field. A second error correction code may be a (42, 36) RS code. To generate the RS code, data is selected at every fourth block to generate a total of 24 blocks of error correction code. Unequality between the number of samples in one field and the number of data stored in one field is handled in the same manner as that in the 525/50 system.

As described above, when the audio signal and other data are digitally recorded on the record medium such as magnetic tape, it is necessary to add the code (error correction code) to detect and correct errors in the data generated during recording and reproduction. The error correction code has different capabilities, redundancies and scales of encoder/decoder circuit depending on the construction. When the audio signal accompanied to the video signal is to be digitally recorded on the VTR tape, it should be compatible to different transmission systems such as 525/60 system and 625/50 system. The present invention shows code formats suitable to those systems, and the error correction codes which comply with various systems can be constructed by merely changing the code length of one of two RS codes which function as the error correction codes. When the present invention is applied to the 525/60 system and the 625/50 system, an error correction code suitable for the respective system can be arranged by somewhat changing the RS code adapted in the rotary head type digital audio tape recorder (R-DAT). In the R-DAT, of the 128 blocks which constitute one data frame, 104 blocks are audio data blocks and the remaining 24 blocks are parity blocks generated based on the data in the data blocks. The parity codes added to each block are called inner codes, and the parity codes generated based on the data in each block are called outer codes. The outer codes are generated from every fourth block, that is, six parities are generated from 104/4 =26 data to construct the (32, 26, 7) RS code. In the present invention, the inner codes are constructed in accordance with the R-DAT code, and the code length of the outer code (the number of data which are basis for parity code generation) is changed so that it is compatible to the 525/60 system and the 625/50 system.

In the 525/60 system, one data frame consists of 144 blocks, of which 24 blocks are the outer code parity blocks. The parity generation blocks are generated from every fourth block of the 120 data blocks, that is, six parities are generated from 30 data blocks to form the (36, 30, 7) RS code. In the 625/50 system, one data frame consists of 178 blocks, of which 144 blocks are data blocks and 24 blocks are parity blocks. Six parities are generated from 36 data blocks to form the (42, 36, 7) RS code.

In the above description, the sampling frequency is 48 kHz. When the sampling frequency is 44.1 kHz or 32 kHz or other, adaptive recording may be performed by controlling the number of samples in one field period. For example, where the sampling frequency is 44.1 kHz in the 525/60 system, the number of samples in one field period is approximately 735.7. Accordingly, the fields which include 735 or less samples and the fields which include 736 or more samples may be provided. Similarly, in the 625/50 system, one field period include 882 samples. Accordingly, the fields which include 881 or less samples and the fields which include 883 or more samples may be provided. Similarly, where the sampling frequency is 32 kHz in the 525/60 system, the number of samples in one field period is approximately 533.9. Accordingly, the fields which include 533 or less samples and the fields which include 534 or more samples may be provided. In the 32 kHz, 625/50 system, the number of samples in one field period is approximately 640. Accordingly, the fields which include 639 or less samples and the fields which include 641 or more samples may be provided.

A data arrangement in which one field of data are recorded by 800-sample data and 801-sample data is explained below.

Figure 8A:
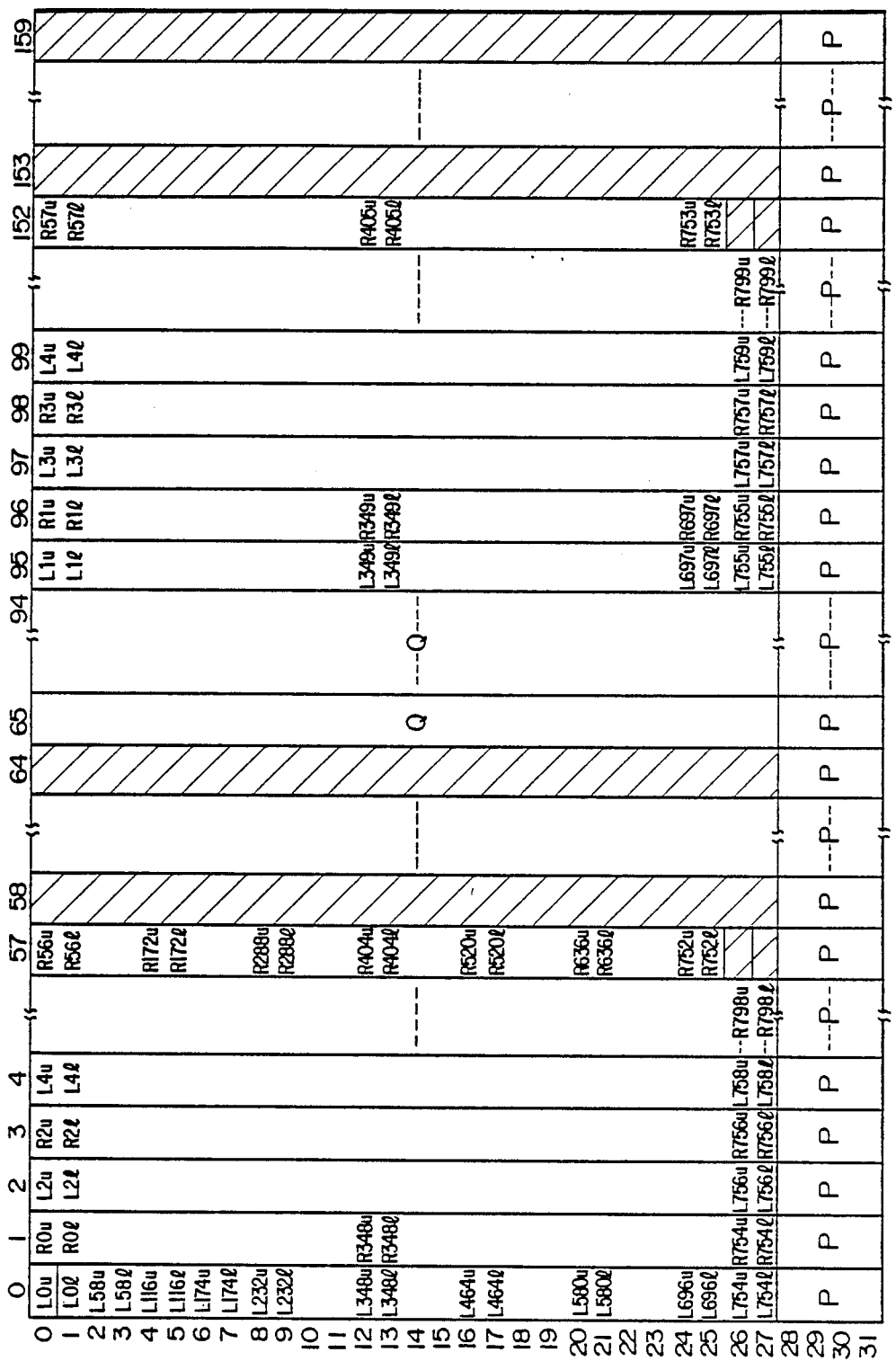
FIGS. 8A, 8B and 9 show recorded data formats in the embodiment of the present invention.
Figure 8B:
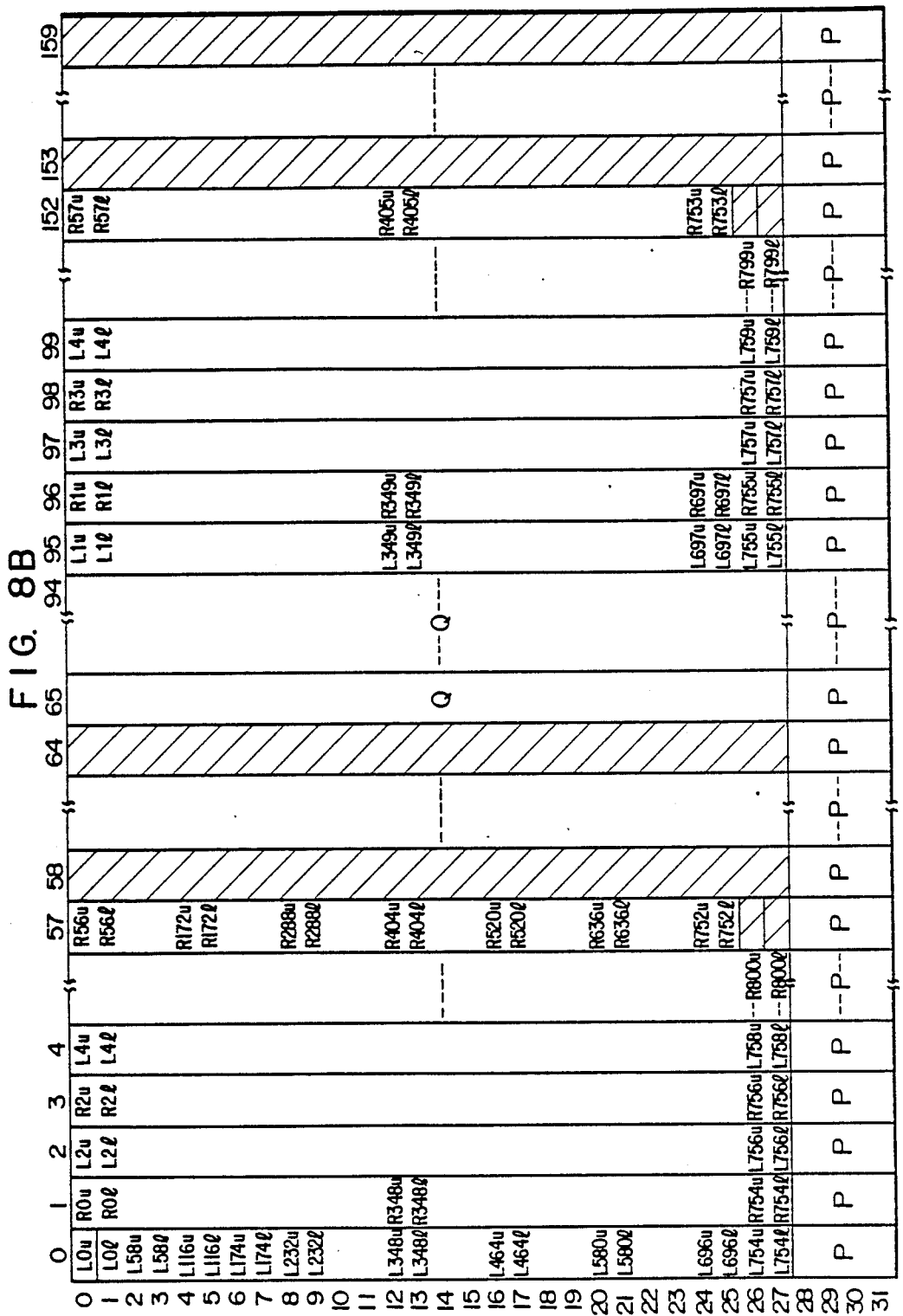

FIGS. 8A and 8B show 800-sample and 801-sample data formats, respectively. Errors for the data required for one field are approximately +0.1% and −0.025%, respectively. If accuracies of a vertical synchronization signal and a sampling frequency of a VTR are of quartz resonator accuracy, the asynchronization therebetween is sufficiently correctable.

Another data format suitable to simplify a configuration of the address control circuit 17 is explained. It is a data arrangement in which one field of data are recorded by 812-(excess) sample data and 754-(diminish) sample data. According to data arrangement, the write address control circuit 17 may access the RAM integer times in the direction of the block number.

In such a data format, the block numbers 58-64 and 153-159 are non-used areas in which the audio data is not recorded. Those areas may be used as sub-code areas in which data other than the audio data are recorded.

In another example, variations of the number of data recorded in each field are equal. One field of data are recorded by 803-sample data and 799-sample data. Variations for 800.8 samples required for each field are +0.23% and −0.28%, respectively.

In such a data format, the block numbers 58-64 and 153-159 are areas in which the audio data is not recorded. The non-used area may be used as sub-code areas in which data other than the audio data are recorded.

Similarly, in the recording, large errors of the VTR vertical synchronizing signal and the sampling frequency may be overcome by setting the data amount in one field significantly larger than 800.8 samples.

Further, by controlling the number of samples in one field in accordance with the output of the address difference extract circuit 50, a more adaptive control can be attained.

While the 525/60 system is used in the above embodiment, a similar advantage is attained in the 625/50 system. In the 625/50 system, the number of blocks per track may be 192.

An error detection and correction code is generated based on the block-interleaved data, and the code length is 32 and the number of blocks is a multiple of 32. Thereby, the corresponding interleave distance may be six blocks. The 192-block interleave format is explained below.

Figure 9:
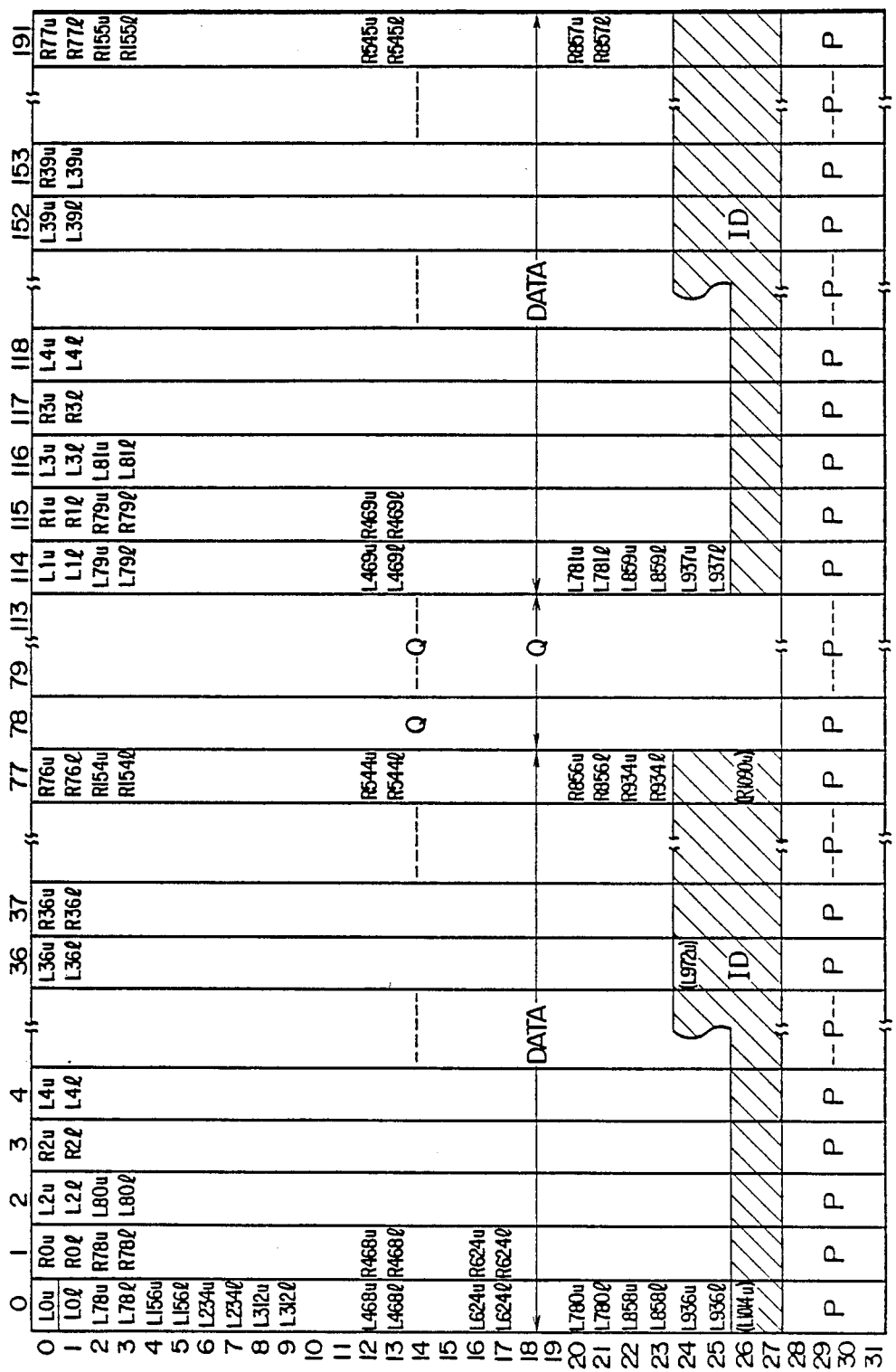

In FIG. 9, the data is distributed over the entire 192-block area. The data 26, 27 or 24, 25, 26, 27 of each block are data other than the audio signal samples. They may be used for ID codes.

In the above explanation, the sampling frequency is 48 kHz. When the sampling frequency is 44.1 kHz or 32 kHz or other, the number of samples in one field may be appropriately controlled. For example, when the sampling frequency is 44.1 kHz in the 525/60 system, the number of samples in one field period is approximately 735.7. Accordingly, the fields which include 735 or less samples and the fields which include 736 or more samples are provided. Similarly, in the 625/50 system, the number of samples in one field is 882. Accordingly, the fields which include 881 or less samples and the field which include 883 or more samples are provided. Similarly, in the 32 kHz, 525/60 system, the number of samples in one field period is approximately 533.9. Accordingly, the fields which include 533 or less samples and the fields which include 534 or more samples are provided. In the 32 kHz, 625/50 system, the number of samples in one field is approximately 640. Accordingly, the fields which include 639 or less samples and the fields which include 641 or more samples are provided.

Figure 10:
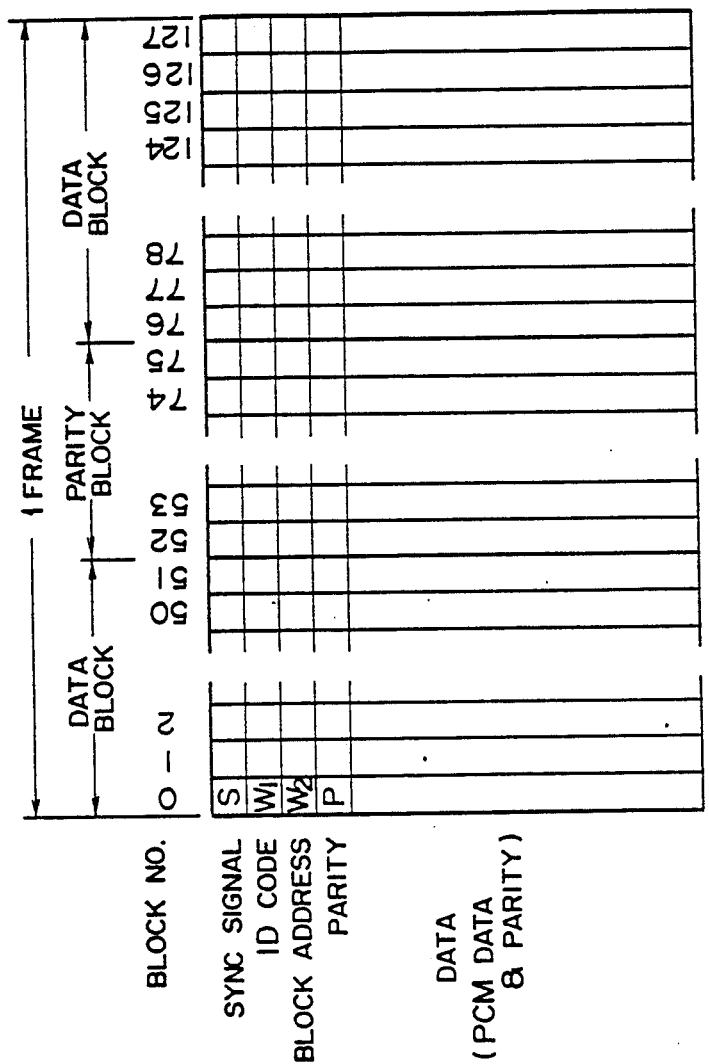
FIG. 10 shows a signal format in an embodiment of a rotary head type digital audio tape recorder of the present invention, FIG. 11 consisting of (A)–(E), shows a recording unit and a data processing timing thereof.

FIG. 10 shows a frame construction in a signal format. One frame consists of 128 blocks, of which 24 blocks are parity blocks. A period of one frame is 15 m seconds.

In such a format, a field period of a VTR (525/60 system) is approximately 16.683 m seconds which is longer than the frame period of 15 m seconds. Accordingly, approximately 142.364 R-DAT blocks are included in one field. Thus, the number of signal samples recorded on the tape is always 143 blocks, and the number of audio signals is 142 blocks or 143 blocks depending on a difference between the write address and the read address. The read address circuit and the control signal circuit are controlled such that if the address difference is larger than a predetermined value, all 143 blocks are used for the audio signal samples, and if the address difference is smaller than the predetermined value, 142 blocks are used for the audio signal samples and the following one block is used for a sample other than the audio signal. In this manner, the asynchronization between the sampling period and the field period is absorbed.

In the present embodiment, in order to avoid the opposite ends of the block, 143 blocks are compression-recorded in a range of 170° in a 180°-area to leave a 5°-space at each of the opposite ends, in which a preamble signal and a postamble signal are recorded.

Because the block addresses are not always continuous in a field, it is not clear in which blocks in the field the data are recorded. Accordingly, in a block format shown in FIG. 24, addresses for indicating the order of blocks in the field are added to the ID code area and they are used together with the block addresses so that the block addresses are easily controlled.

In another embodiment, the number of blocks in one field is constant at 143, and for the field which includes 142 blocks, one block thereof is used for a signal other than audio signal. The non-audio block may be the first or last block of the 143 blocks.

The non-audio block may include control signals.

Figure 24:
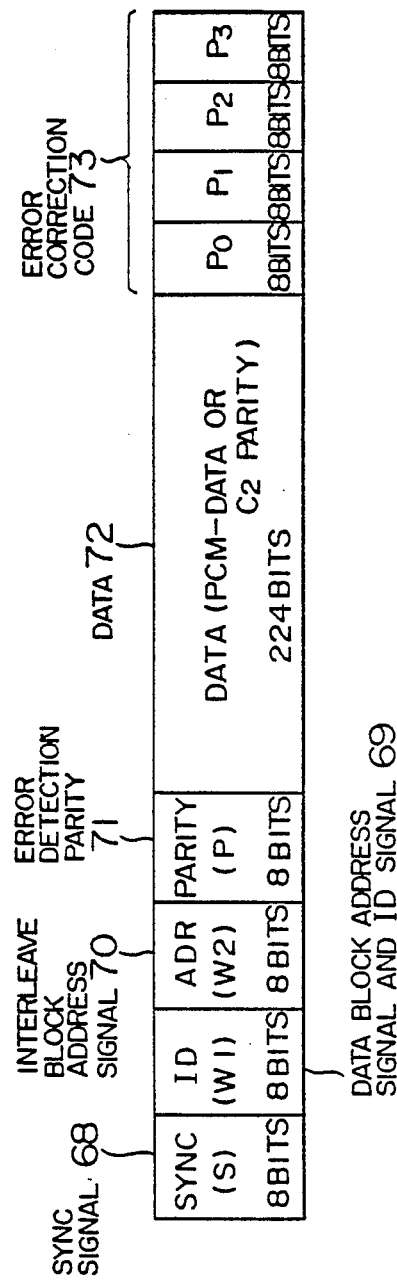
FIG. 24 shows a block format.

In the block format shown in FIG. 24, a code indicating whether the samples of the block are audio signals or non-audio signals is recorded at a most significant bit of the block address. For example, if the samples in the block are audio signals, "0" is recorded, and if the samples are non-audio signals, "1" is recorded. In the reproducing mode, the signal discrimination circuit 44 determines whether the data in the block are to be recorded in the RAM or not, based on the above code.

In another embodiment of the present invention, one block consists of 36 symbols and 142 blocks of data in the 525/60 (NTSC) system or 170 blocks of data in the 625/50 (PAL) system are recorded in each track. An error correction code for the R-DAT is added and the data are distributed so that large burst errors can be corrected. As an example of distribution, even-numbered data are recorded in the front half of the track and odd-numbered data are recorded in the rear half.

A data recording method for a data arrangement in which one data frame consists of 128 blocks and one video field period contains 142 blocks.

Figure 11:
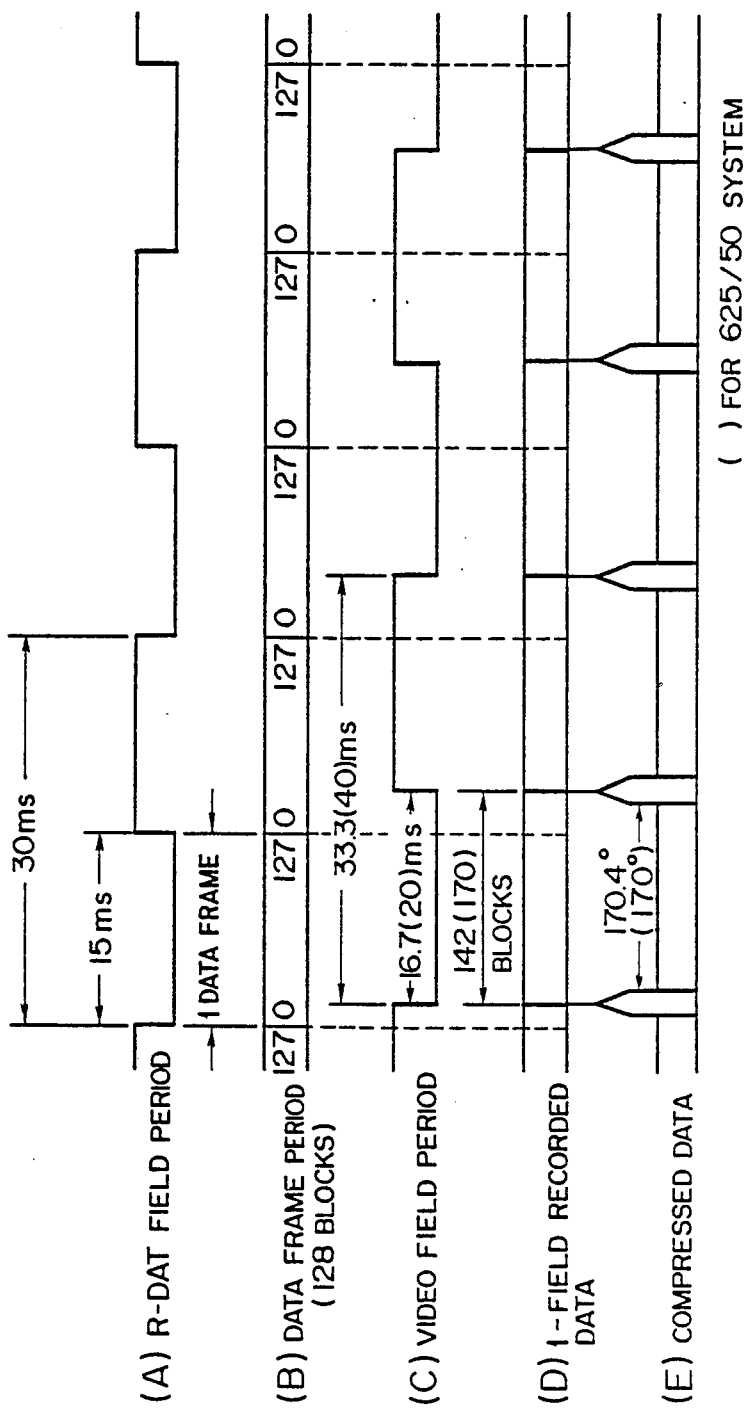

FIG. 11 shows a timing chart of a signal processing unit and a recording unit. A waveform (A) shows a field period of the R-DAT. One frame period is 30 msec. and one field period is 15 msec. A waveform (B) shows a data frame period. One data frame consists of 128 blocks which are recorded in the field period of the waveform (A). Thus, in the R-DAT, the field period of the recording unit and the processing time of the data frame of the signal processing unit are synchronous with each other.

On the other hand, the field period of the video signal is 16.7 msec in the 525/60 system, and 20 msec in the 625/50 system as shown by a waveform (C). In the present embodiment, 142 blocks or 170 blocks are recorded in one field period as shown by a waveform (D). They are time-compressed to 170.4/180 in the 525/60 system and to 170/180 in the 625/50 system and recorded in the area of head rotation angle of 170.4° or 170° as shown by a waveform (E).

Figure 12A:
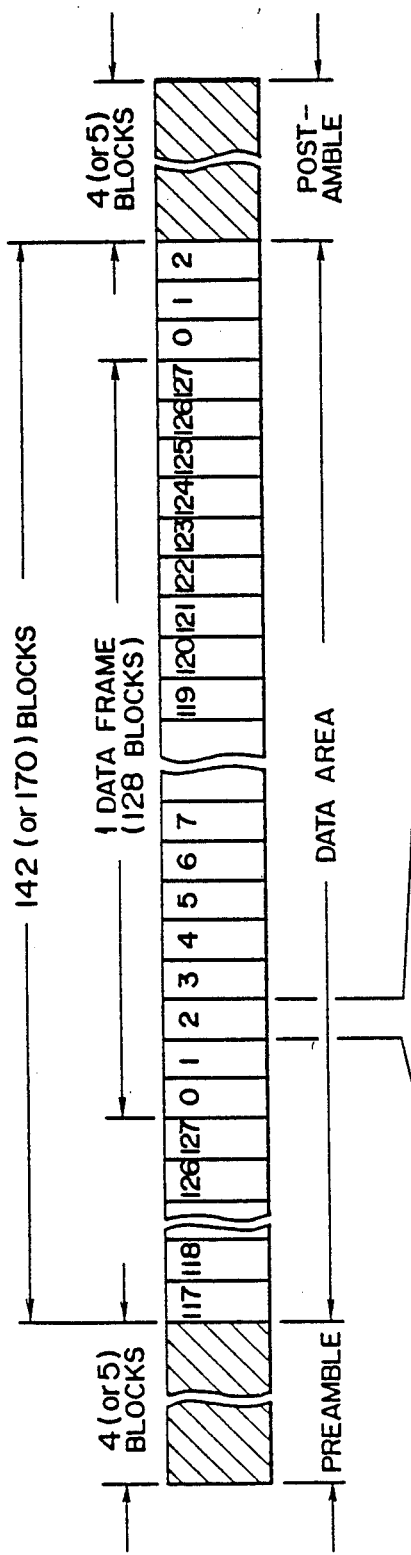
FIGS. 12A and 12B show one-field formats.
Figure 12B:
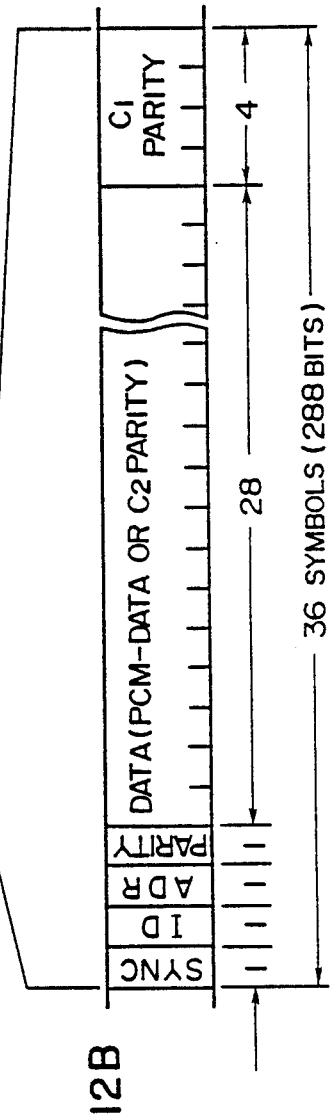

One field of data thus generated is shown in FIGS. 12A and 12B. In one field, 142 data blocks for the 525/60 system and 170 data blocks for the 625/50 system are recorded irrespective of the joint of the data frames. A block address is recorded in each block as shown in FIG. 12A and one of addresses 0–127 corresponds thereto. The data are processed by 128 blocks (blocks 0–127) or one data frame. The data arrangement in the data frame will be explained later. In the present embodiment, the 142 or 170 data blocks are time-compressed and recorded in the area of head cylinder rotation angle of 170.4° or 170°. Such data record area is called a data area. The areas other than the data area are called a preamble and a postamble in which data strobing PLL signal is recorded. In the present embodiment, the preamble and the postamble each includes 4 blocks in the 525/60 system and 5 blocks in the 625/50 system. On the other hand, one data block consists of 36 symbols or 288 bits as shown in FIG. 12B. Of those, the first four symbols are for synchronization signal (SYNC), identification data (ID), address signal (ADR) and parity signal (PARITY) which is a bit-by-bit modulo 2 sum of the identification data and the address signal. The following 28 symbols are for audio data (PCM data) or $C_2$ parity signal generated based on the audio data. The last four symbols are for $C_1$ parity signal generated based on the data in the block by a predetermined method such as a Reed-Solomon code.

In the system in which the video signal is recorded together with the digital audio signal, a digital signal from a digital audio signal source such as a digital audio tape recorder is directly recorded in order to avoid degradation of the quality of the digital audio signal. In this case, since a data rate of the digital audio signal depends on the signal source, it is asynchronous with the field or frame period of the video signal source. In the present embodiment, the number of samples of the digital audio signal to be recorded in one video signal field period must be set so as to prevent disconnection of audio data frames occurring at every video frame in the recording. However, because of the asynchronous relationship, the number of samples is not constant and not always integer. In the present embodiment, in order to resolve the asynchronization problem, a variable number of digital audio samples in the data field are used.

In the present invention, 128 blocks of digital audio signal are used as the data frame and the interleave and the code are completed in the data frame. Since one field does not synchronize with one data frame, one or more data frames are recorded in one field.

Four types of data frame completed interleave format are shown by the sampling frequency and the number of channels of audio signal.

FIG. 13 shows the types of data frame completed interleave format. In a mode 1, the number of audio signals is 2 channels, the sampling frequency is 48 kHz and the number of quantization is 16 bits. The number of quantization (16 bits) is divided into 8-bit data. Approximately 66.67 (=2000/30) data frames are included in one second. Thus, $$48 \text{ kHz} \times 2 \text{ ch.} \times 2 \text{ data}/(2000/30) = 2880 \text{ data}$$

are recorded in one data frame in a standard mode. In accordance with the teaching of the present invention, if the number of data in each field is not constant, the number of data in the data frame is increased or decreased from the standard number of data to allow recording with a fixed length data frame.

In mode 2, $$32 \text{ kHz} \times 2 \text{ ch.} \times 2 \text{ data}/(2000/30) = 1920 \text{ data},$$

in mode 3, $$32 \text{ kHz} \times 4 \text{ ch.} \times 2 \times (12/16) \text{ data}/(2000/30) = 2880 \text{ data},$$

and in mode 4, $$44.1 \times 2 \text{ ch.} \times 2 \text{ data}/(2000/30) = 2646 \text{ data}$$

are recorded in one data frame in the standard mode.

The interleaved formats in the data frame in the respective modes are now explained.

Figure 14:
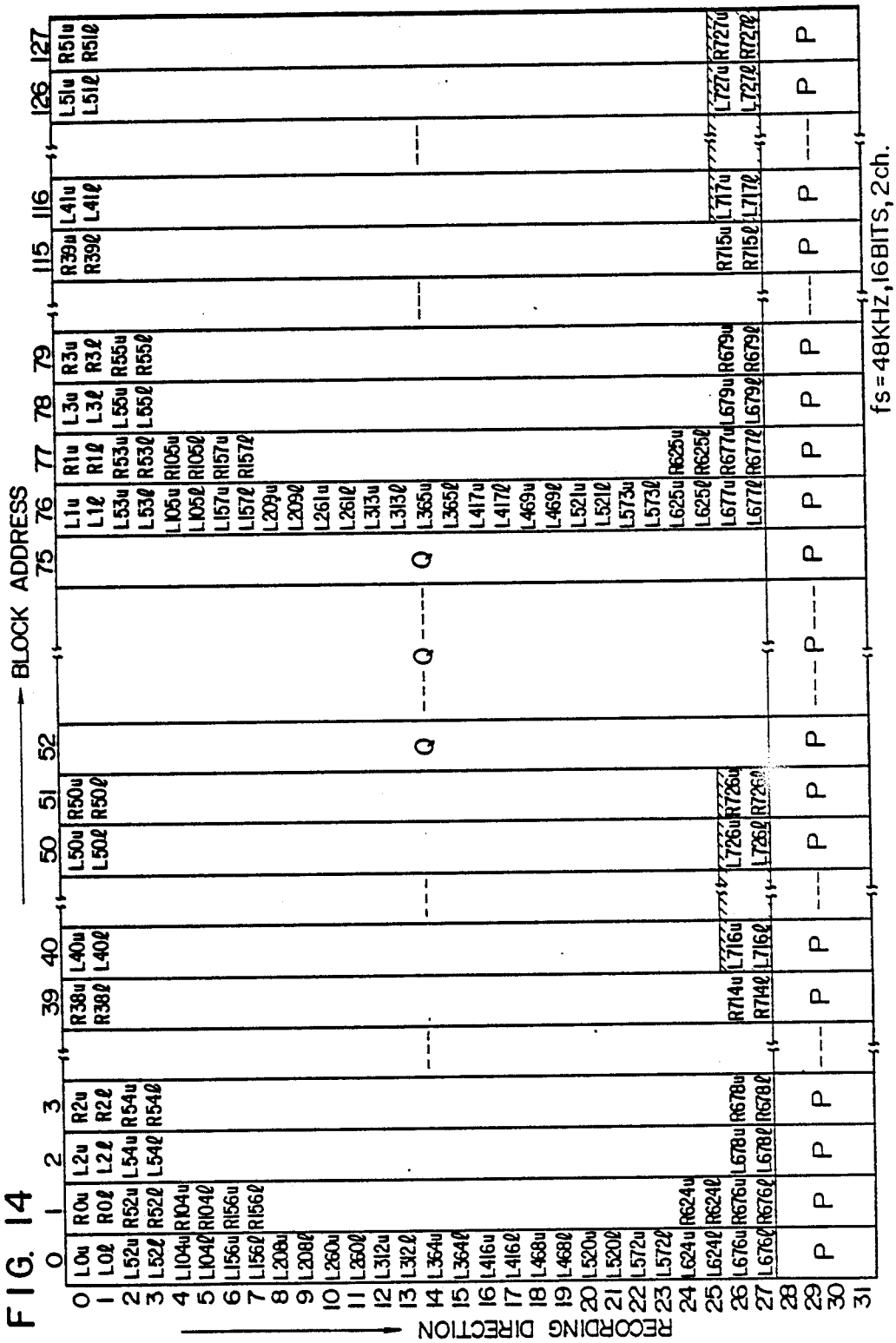
FIG. 14 shows a mode 1 interleave format.

FIG. 14 shows the interleaved format in one data frame when the number of audio signals is 2 ch., the sampling frequency is 48 kHz and the number of quantization is 16 bits. The 16-bit digital audio signal is divided into high order and low order 8-bit data, to which suffixes u and l are added for identification. The 2 channels of audio signals are designated by L and R.

A maximum number of samples which can be recorded in one data frame is 728 for each of L and R channels. They are designated by suffixes 0–727. The data are supplied to the data frames in the order of $L_{0u}$, $L_{0l}$, $R_{0u}$, $R_{0l}$, $L_{1u}$, $L_{1l}$, $R_{1u}$, $R_{1l}$, ...., $L_{727u}$, $L_{727l}$, $R_{727u}$, $R_{727l}$ to form 104 blocks. Based on those data, 24 Q parity blocks are generated so that a total of 128 blocks are formed.

Four P parities are added to each block so that 128 blocks each consisting of 32 data and parities constitute one data frame. When they are recorded on a tape, they are recorded in the order of block addresses 0, 1, 2, ..... 127. Accordingly, the adjacent data in the sampling are distributed in the recording.

As a result, even if a burst error of the data occurs by a defect on the tape or other cause, the burst error is distributed by the interleaving and the data can be corrected or lost data can be supplemented by using the parities.

Because the field frequency and the audio signal sampling frequency are different from each other, the data are recorded by adjusting the number of data in the data frame. When the number of data is small, the data $L_{0u}$, $L_{0l}$, ....., $L_{715u}$, $L_{715l}$ and $R_{0u}$, $R_{0l}$, ..., $R_{715u}$, $R_{715l}$ constitute one data frame, and when the number of data is large, the data $L_{0u}$, $L_{0l}$, ....., $L_{727u}$, $L_{727l}$ and $R_{0u}$, $R_{0l}$, ....., $R_{727u}$, $R_{727l}$ constitute one data frame.

The number of data in the data frame may be adjusted by switching between the data frame having the data 0–715 for each of L and R channels and the data frame having the data 0–727, switching among the data frame having standard number of data 0–719 for each of the L and R channels, the data frame having the data 0–715 and the data frame having the data 0–727, or switching between the data frame having any of 0–715 data and the data frame having any of 0-727 data for each of the L and R channels.

Figure 15:
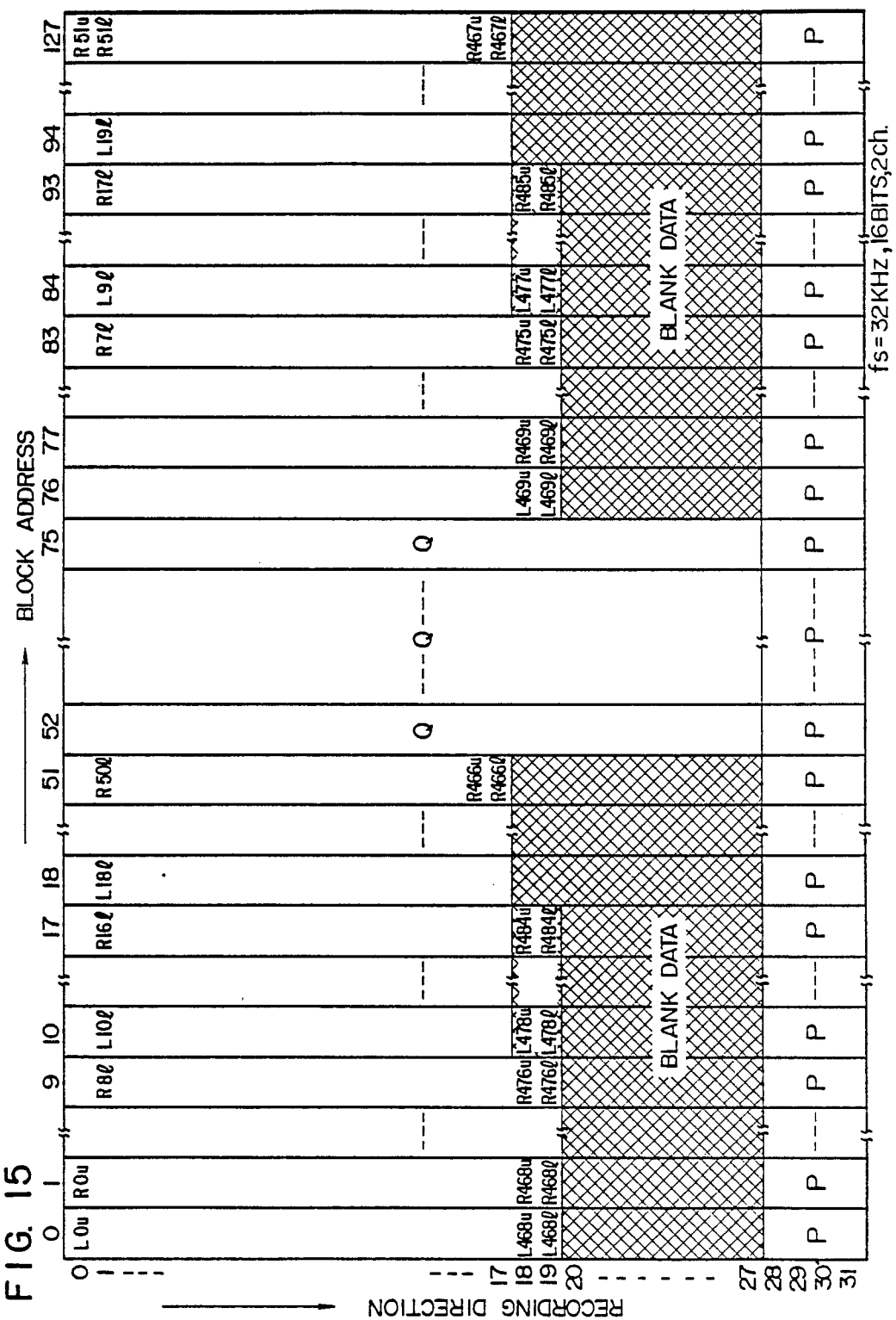
FIG. 15 shows a mode 2 interleave format.

FIG. 15 shows a data frame interleave format when the number of audio signal channels is two, the sampling frequency is 32 kHz, and the number of quantization is 16 bits.

The maximum number of samples is 486 for each of L and R channels. There still is a space for data in the data frame but it is not used as blank data.

The Q parities and P parities are added in the same manner as that shown in FIG. 14.

The number of samples in the field for each of L and R channels is varied between 0-476 at minimum and 0-485 at maximum, and one of the three methods, that is, the selection between two data frames, the selection among three data frames and the selection among any number of data frames may be used.

Figure 16:
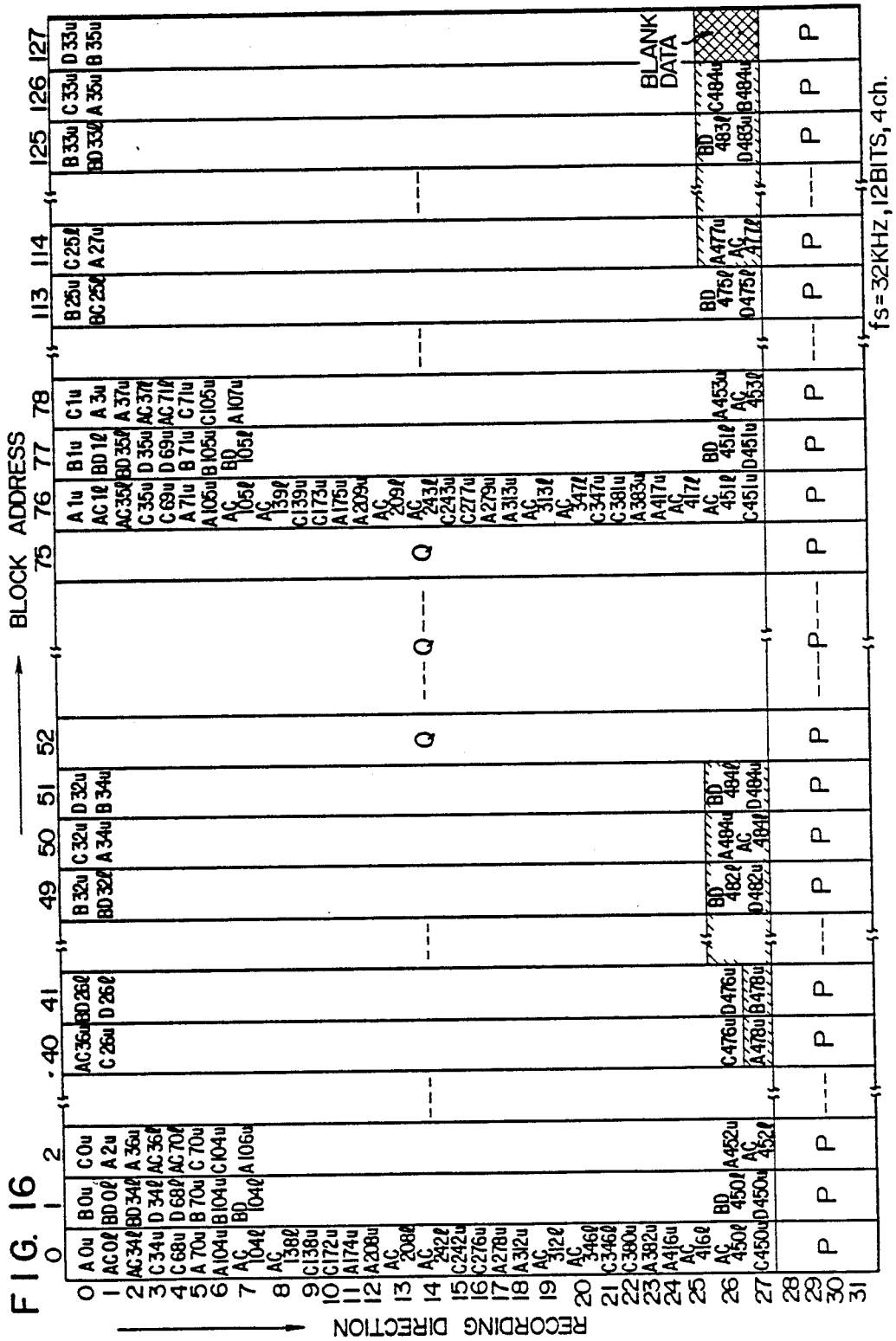
FIG. 16 shows a mode 3 interleave format.

FIG. 16 shows a data frame interleave format when the sampling frequency is 32 kHz, the number of quantization is 12 bits and the number of audio signal channels is 4. Since the data are handled 8 bits at a time, the 12-bit digital audio signal data is divided into high order 8 bits and low order 4 bits. The high order 8 bits are represented by $A_{iu}$, $B_{iu}$, $C_{iu}$ and $D_{iu}$, and the low order 4 bits are combined with two digital audio signal data to constitute an 8-bit data represented by $AC_{il}$ and $BD_{il}$, where i is a suffix indicating the order of the digital audio signal data. Up to 485 12-bit 4-channel data are recorded in one data frame. A, B, C and D represent 4 channels of audio signals.

The data are arranged in the data frame in the order of $A_{0u}$, $AC_{0l}$, $C_{0u}$, $B_{0u}$, $BD_{0l}$, $D_{0u}$, ....., $A_{484u}$, $AC_{484l}$, $C_{484u}$, $B_{484u}$, $BD_{484l}$, $D_{484u}$ to constitute 104 blocks. 24 Q parity blocks are generated, and a P parity is added to each block. One data frame consists of 128 data/parity blocks.

Upto 485×4 channels of digital audio signal data are recorded in one data frame. Since 4 channels of data are handled as a unit, there is a difference from the maximum number of data in the data frame. This difference makes excess two data for blank data.

The number of data in the data frame is varied between 0-476 at minimum and 0-484 at maximum for each of four channels A-D, and two, three or any number of data frames are selectively used.

Figure 17:
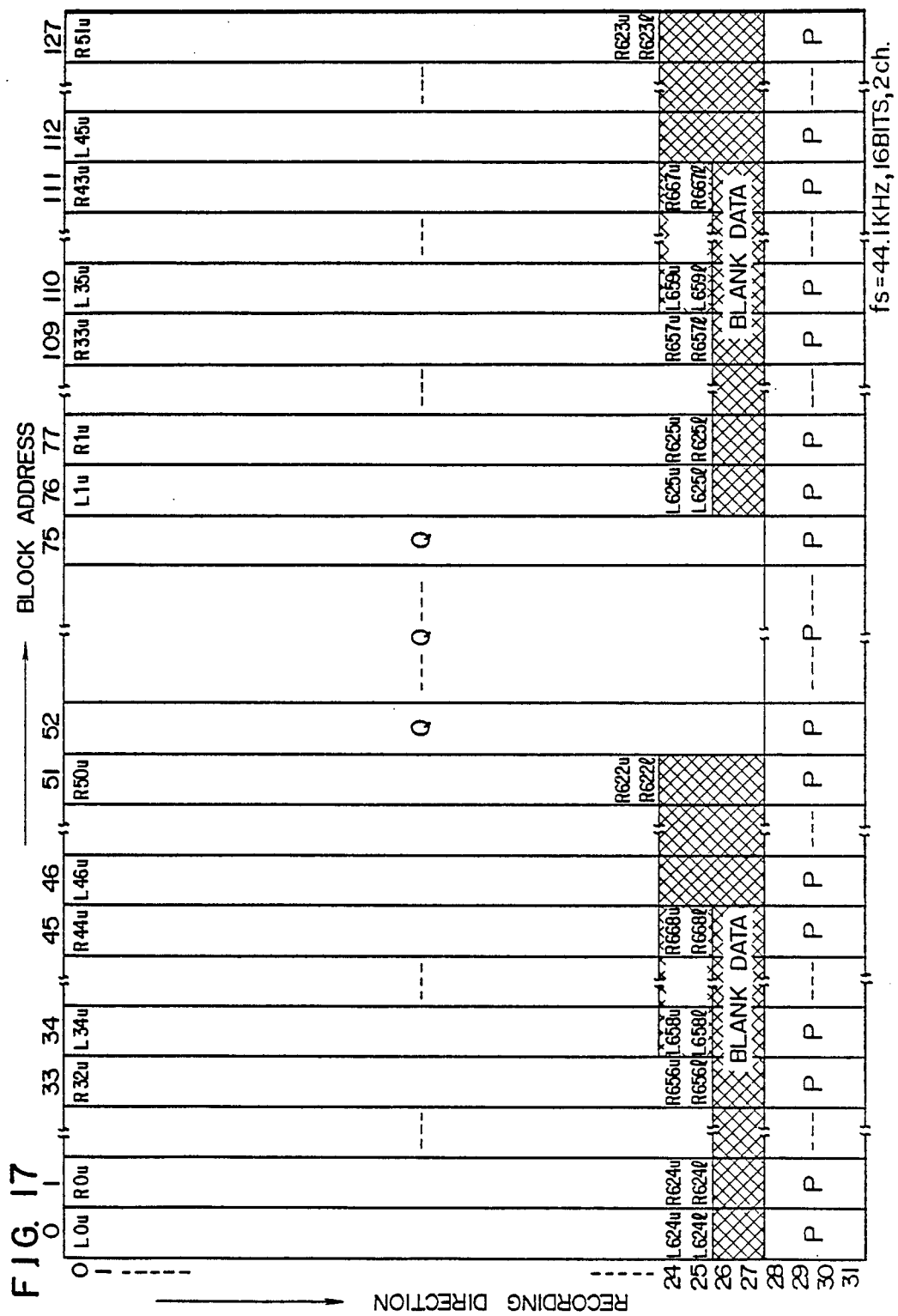
FIG. 17 shows a mode 4 interleave format.

FIG. 17 shows a data frame interleave format when the number of audio signal channels is 2, the sampling frequency is 44.1 kHz and the number of quantization is 16 bits. The maximum number of samples is 669. Up to 720 data can be recorded in one data frame and the remainder is blank data.

The Q parities and P parities are added in the same manner as that shown in FIG. 14.

Figure 18:
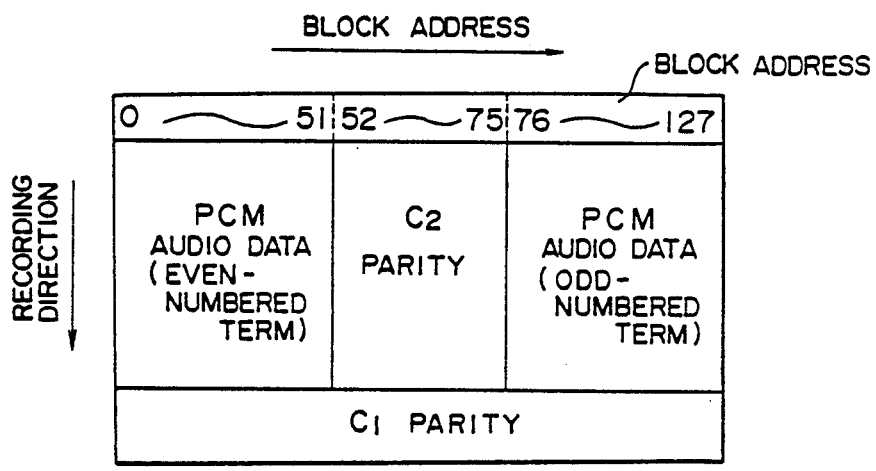
FIG. 18 shows a data format with a $C_2$ parity being at the center.

The number of data frames is varied between 0-657 at minimum and 0-668 at maximum for each of L and R channels in accordance with the change of the number of samples in the field, and two, three or any number of data frames are selectively used. Data arrangement of error detection/correction $C_1$ and $C_2$ parity and PCM audio data is shown in FIG. 18. The even-numbered data and the odd-numbered data of the sampled PCM audio data in each channel are arranged in space, and the $C_2$ parity is generated in the direction of block address and the $C_1$ parity is generated in the direction of recording to form the PCM data in the data frame. The even-numbered PCM data are recorded in the block addresses 0-51, and the odd-numbered PCM data are recorded in the block addresses 76-127, and the $C_2$ parities are recorded in the block addresses 52-75.

In the recording mode, 142 blocks of audio data are recorded in one field period for the 525/60 (NTSC) system and four block periods of preamble data are added before and after the audio data. In the 625/50 (PAL) system, five block periods of amble data are added before and after 170 blocks of audio data. Since a plurality of data frames of the audio data are recorded adjacently, if a reproduction error occurs between adjacent data frames by a scratch or the like, the PCM audio data area may be broken or the error detection/correction circuit may misdetect or miscorrect the error.

Figure 19:
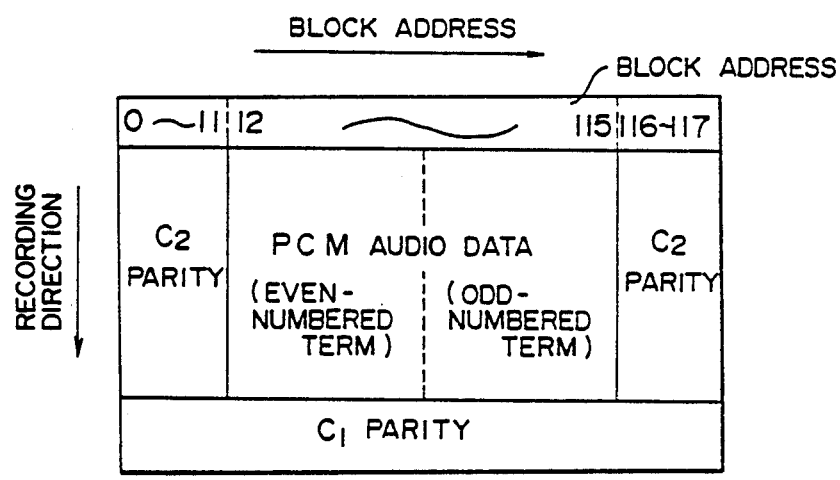
FIG. 19 shows a data format with $C_2$ parities being at the opposite ends.

In another embodiment shown in FIG. 19, the $C_2$ parities are arranged before and after the PCM audio data, that is, at the opposite ends of the data frame. The $C_2$ parities are recorded at the block addresses 0-11 and 116-127, and the PCM audio data are recorded at the block addresses 12-115.

Figure 20:
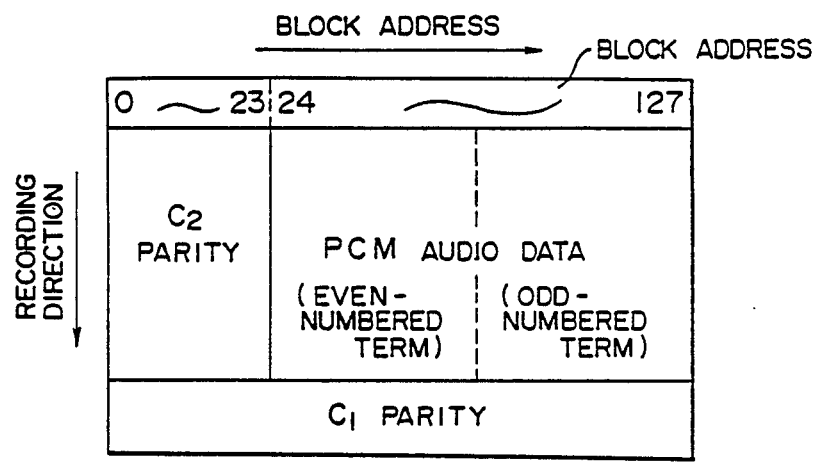
FIG. 20 shows a data format with a $C_2$ parity being at the beginning.

In another embodiment shown in FIG. 20, the $C_2$ parities are arranged before the PCM data, that is, in a front area of the data frame. The $C_2$ parities are recorded at the block addresses 0-23 and the PCM audio data are recorded at the block addresses 24-127.

Figure 21:
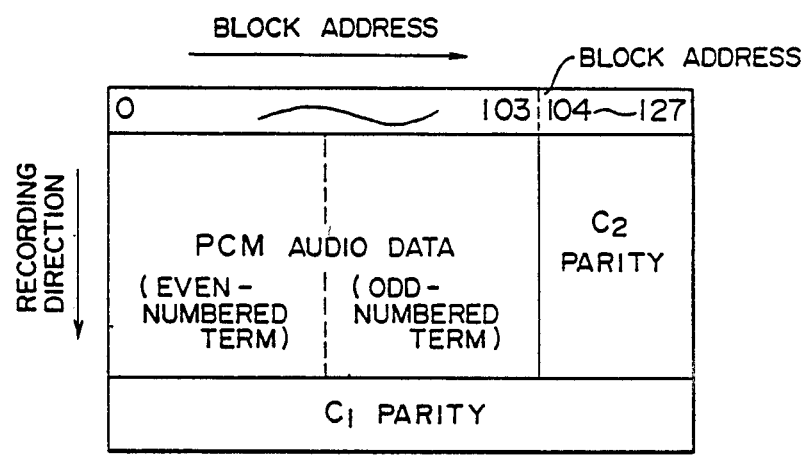
FIG. 21 shows a data format with a $C_2$ parity being at the end.

In other embodiment shown in FIG. 21, the $C_2$ parities are arranged after the PCM data, that is, in a rear area of the data frame. The $C_2$ parities are recorded at the block addresses 104-127 and the PCM audio data are recorded at the block addresses 0-103.

Figure 22:
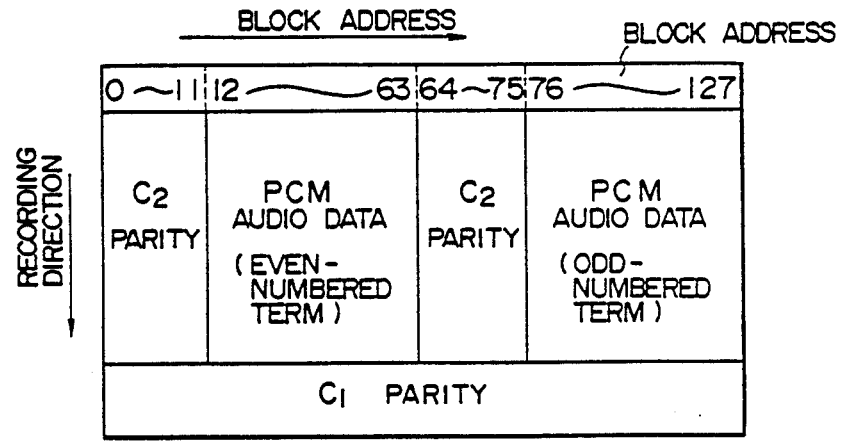
FIG. 22 shows a data format with $C_2$ parities being at the beginnings of an odd-numbered field and an even-numbered field of an audio data.

In another embodiments shown in FIG. 22, the $C_2$ parities are arranged before and after the even-numbered and odd-numbered PCM audio data. The $C_2$ parities are recorded at the block addresses 0-11 and 64-75, the even-numbered PCM audio data are recorded at 12-63, and the odd-numbered PCM audio data are recorded at 76-127.

By arranging the $C_2$ parities before and after the data frame, that is, in the front or rear area, the PCM audio data can be protected against the reproduction error between the data frames. This is advantageous in an algorithm for a mean-value interpolation processing in which the audio data, is outputted without correction when the number of errors is larger than a predetermined value.

Figure 23:
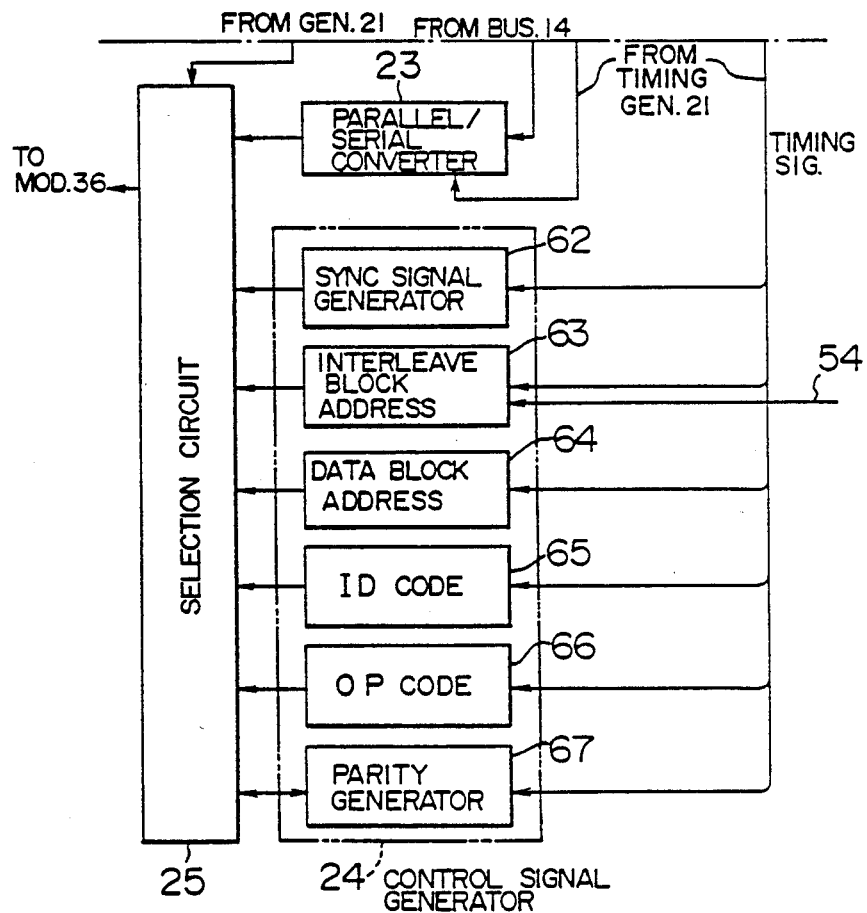
FIG. 23 shows a block diagram of a configuration of a portion of another embodiment of the PCM audio signal recording and reproducing apparatus of the present invention.

FIG. 23 shows an embodiment of the control signal generation circuit 24. It comprises a synchronization signal generation circuit 62 for generating a synchronization signal, in interleave block address (IBADR) signal generation circuit 63, a data block address (OBADR) signal generation circuit 64, an identification signal (ID code) generation circuit 65, an option code (OP code) generation circuit 66 and a parity generation circuit 67. The signals generated in the control signal generation circuit 24 as well as data sent from a parallel-serial converter (P/S) 23 are supplied to a selection circuit 25 where they are selected and added for each block in accordance with a predetermined block format.

One embodiment of the block format is shown in FIG. 24. One block consists of a synchronization signal 68, $W_1$ (data block address signal and identification signal) 69, $W_2$ (interleave address signal) 70, a parity signal 71 generated from $W_1$ 69 and $W_2$ 70, a digital data 72 and an error correction code 73. The synchronization signal 68 consists of an eight-bit specific pattern indicating the beginning of the block, and it is a time reference when the data is read in the reproducing mode. The data block address signal indicates a memory address on a RAM of the digital data of one block. The reproduced digital data is stored at the memory addresses with reference to the data block address signal, for subsequent processing. The identification signal indicates various information associated with the recorded audio signal. The interleave block address signal 70 indicates a memory address on the RAM for interleave/deinterleave processing. The interleaving is carried out with reference to this signal, and in the reproducing mode, the digital data of the block written at a predetermined address by the data block address signal is deinterleaved with reference to this signal. The parity signal 51 is generated based on the previous 16 bits, that is, $W_1$ 69 and $W_2$ 70. It may be generated by modulo 2 simple addition. This signal detects and corrects errors in $W_1$ 69 and $W_2$ 70, and protects those signals from dropout or noise. The data 72 may be a 224-bit digital audio data. The error correction code 73 is a 32-bit (32, 8) Reed-Solomon error correction code.

An embodiment of $W_1$ is explained with reference to FIG. 25. The data block address signals 74, 75, 76, 77 and the identification signals 78, 79, 80, 81 are alternately written in $W_1$. In the reproducing mode, the data block address signal and the identification signal are detected by a flag at the MSB. For example, if the MSB is "0", the signal is the data block address signal, and if it is "1", the signal is the identification signal. The data block address signal indicates a relative order of the blocks in one scan (one field) period of the rotary head. It may be 0-N cyclic codes. The identification signal consists of a 3-bit option code and two 2-bit ID codes. The ID codes include eight types of information signals. For example, ID-1 of the identification signal 78 contains format information, ID-2 contains emphasis information for the audio signal, ID-3 of the identification signal 79 contains sampling frequency information, ID-4 contains number of channels information, ID-5 of the identification signal 80 contains number of quantization information, ID-6 contains tape speed information, ID-7 of the identification signal 81 contains copy enable information, and ID-8 contains pack data information. The detection of the ID codes 1-8 is done by the low order bits of the data block address signal of the front block. For example, if the low order two bits of the data block address signal of the front block are "00", the ID codes are ID-1 and ID-2, if they are "01", the ID codes are ID-3 and ID-4, if they are "10", the ID codes are ID-5 and ID-6, and if they are "11", the ID codes are ID-7 and ID-8.

One embodiment of $W_2$ is explained with reference to FIG. 26. The interleave block address signal of $W_2$ consists of eight bits. A flag bit at the MSB indicates whether the block data is to be handled as the PCM data or not. For example, if the flag bit is "0", the data is read in, and if the flag bit is "1", the data is not read in. The remaining seven bits indicate a relative order for interleave/deinterleave processing. For example, when the interleaving is completed in 128 blocks, the addresses are a cyclic code which is sequentially incremented between 0 and 127.

Another embodiment of the present invention is explained with reference to FIG. 27. Identification signals and data block address signals and alternately arranged in $W_1$ 69 in accordance with the value of lower three bits (including the LSB) of $W_2$ 70, that is, interleave block address signal. For example, when the low order three bits of $W_2$ 70 and "000", the identification signal 69-1 is inserted. When the low order bits of $W_2$ 70 are "001", the data block address 69-2 is inserted, when they are "010", the identification signal 69-3 is inserted, when they are "011", the data block address 69-4 is inserted, when they are "100", the identification signal 69-5 is inserted, when they are "101", the data block address 69-6 is inserted, when they are "110", the identification signal 69-7 is inserted, and when they are "111", the data block address 69-8 is inserted. In the reproducing mode, the identification signal and the data block address are discriminated by the lower three bits of $W_2$ 70, and the identification signals 69-1, 69-3, 69-5 and 69-7 are also discriminated. The identification signal 69-1 consists of the ID code 1, the ID code 2 and the frame address, the identification signal 69-3 consists of the ID-3, the ID-4 and the frame address, and the identification signal 69-5 consists of the ID-5, the ID-6 and the frame address, and the identification signal 69-7 consists of the ID-7, the ID-8 and the frame address. The frame address indicates a relative order in each scan (frame) of the rotary head.

Figure 28:
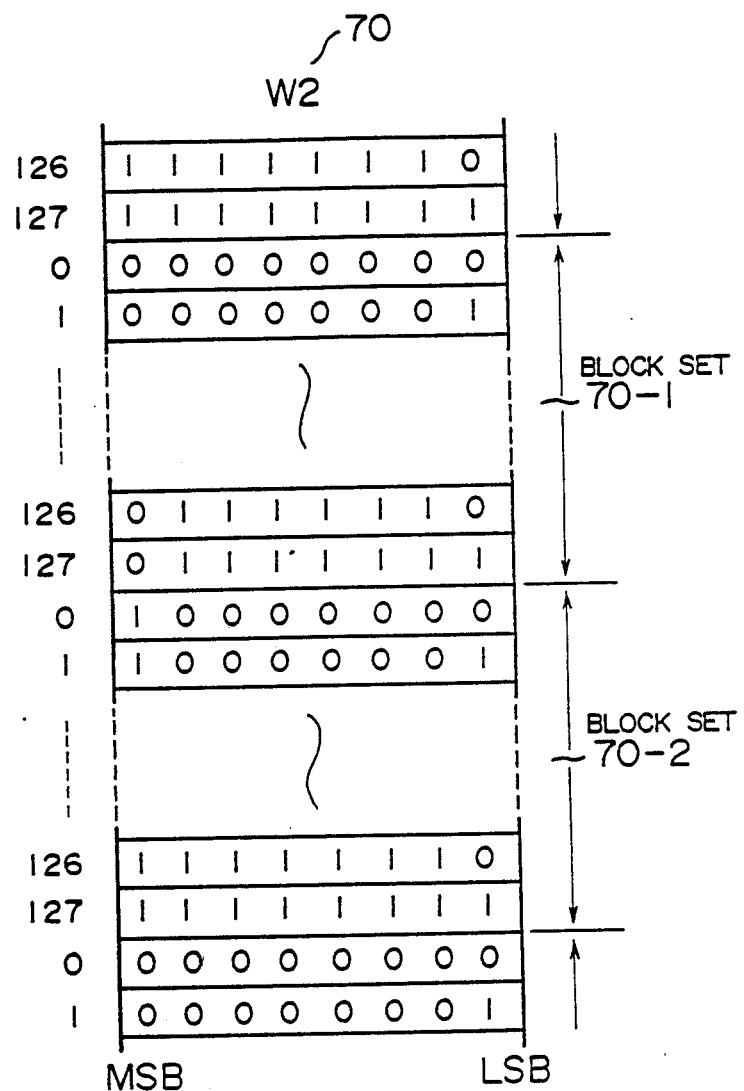
FIG. 28 shows another format of $W_1$ of FIG. 24.

Another embodiment of $W_2$ 70 is explained with reference to FIG. 28. The $W_2$ 70 is the 8-bit interleave block address signal which completes in every 128 blocks. A flag is added at the MSB of the address signal to discriminate blocks before and after the 128 blocks (block set). For example, when the flag at the MSB is "0", the block set 70-1 is discriminated, and when it is "1", the block set 70-2 is discriminated.

When the R-DAT format is used, the MSB "0" corresponds to the + azimuth track data of the R-DAT, and the MSB "1" corresponds to the − azimuth track data of the R-DAT.

Each block thus formed is assembled into N blocks so that 142 or 143 blocks are recorded in one field period or one scan period of the rotary head.

When the data format in the interleaved block as shown in FIG. 10 is used, even if the number of blocks in one field is not constant, the blocks reproduced by the rotary head are written into predetermined deinterleaving memory address by the interleave block address signal, and the deinterleaving is carried out upon the completion of the interleaved blocks.

Figure 29:
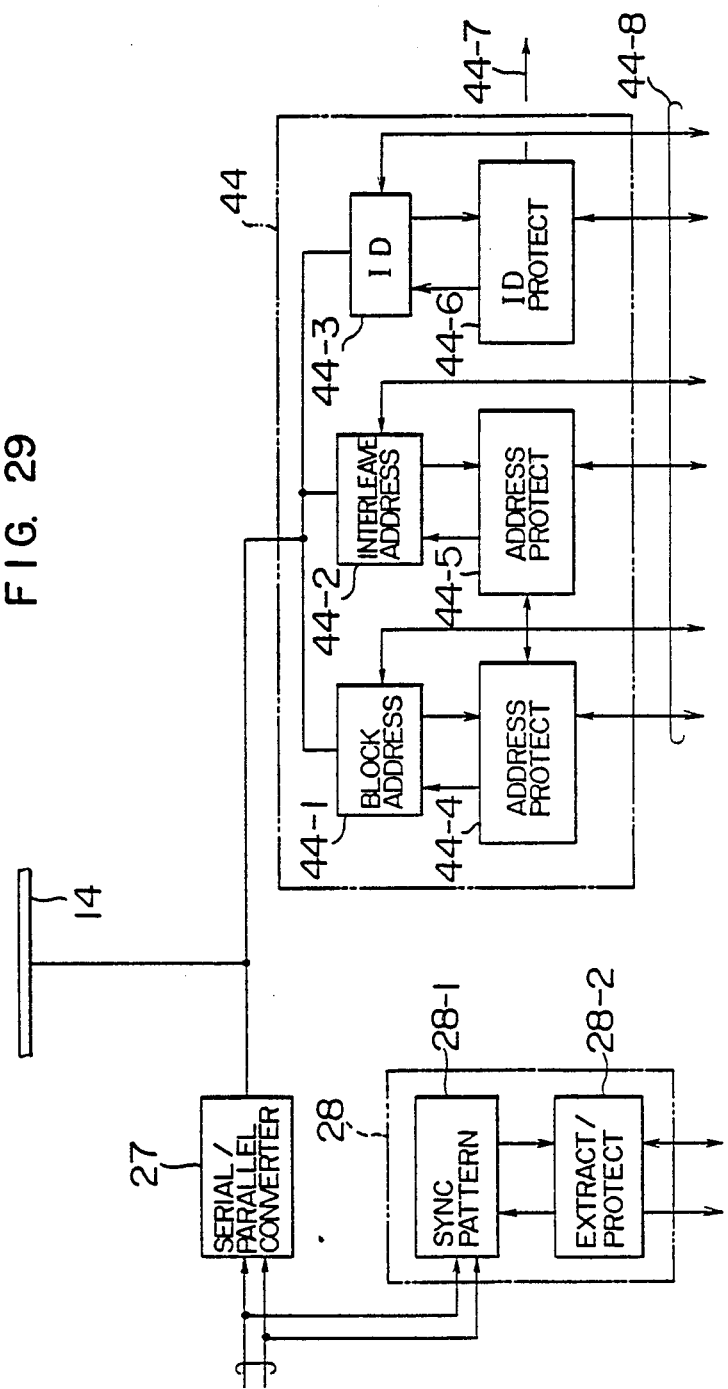
FIG. 29 shows a block diagram of a control signal processing circuit.

FIG. 29 shows an embodiment of the control signal processing circuit 44. The synchronization signal detection circuit 28 comprises a synchronization signal pattern extract circuit 28-1 and a synchronization signal detection protect circuit 28-2, and generates a block synchronization signal and a word synchronization signal.

The control signal processing circuit 44 comprises a block address latch 44-1, an interleave block address latch 44-2, an ID signal latch 44-3, a block address detection protect circuit 44-4, an interleave block address detection protect circuit 44-5 and an ID signal detection protect circuit 44-6. An ID signal output 44-7 produces a sampling frequency and control signals such as emphasis signal. The interlcave block address is protected by the block address signal. Because the interleave blocks are discontinuous between the fields, block errors and losses between the blocks should be protected.

For example, the address data are sequentially incremented by the correction counters when there is an error in the signal, and the miscorrection can be detected and corrected by referring to the address data.

The number of samples in the field is extracted by the control signal processing circuit 44 and the control signal of the read address circuit 19 is generated by the timing generator 21 based on the extracted number of samples to control the circuit 19.

What is claimed is:

1. A PCM audio signal recording circuit for converting an input audio signal to a digital signal, encoding said digital signal for an error detection/correction, distributing and block-formatting the encoded data to form blocks, modulating the block-formatted data and recording the data of a predetermined number of M blocks on a record medium at a field frequency asynchronous with an audio signal sampling frequency, comprising:

memory means for storing said digital signal;

a detection circuit for detecting, in each period equal to m blocks different from and smaller than said M blocks, ratios of said field frequency and said audio signal sampling frequency based on input of said digital signal to said memory means and output of the digital signal from said memory means; and a control circuit responsive to an output of said detection circuit for controlling a read rate of said memory means to control the number of samples of said digital signal to be recorded in each block on said record medium;

wherein said control circuit includes a selection circuit for selecting one of at least two data fields in accordance with the output of said detection circuit to match a video field to an audio data field an asynchronous relation between the field frequency and the audio sampling frequency, said data fields including an excess field ($N+\beta$ samples/field) having a larger number of data in one data field formed of m blocks and a diminish field ($N-\alpha$ samples/field) having a smaller number of data in one data field formed of m blocks, where N is a standard number of data, and $\alpha$ and $\beta$ are integers different from each other.

2. A PCM audio signal recording circuit according to claim 1 wherein a data field is selected in accordance with the magnitude of the output of said detection circuit relative to a predetermined ratio or a difference between a read address count and a write address count of said memory means.

3. A PCM audio signal recording circuit according to claim 1 further comprising means for generating an identification signal of the selected data field and supplying the identification signal to said record medium.

4. A PCM audio signal recording circuit according to claim 3 further comprising:

a circuit for detecting the identification signal of the data field from said record medium; and a circuit for controlling the audio digital signal picked up from said record medium in accordance with the detected identification signal to reproduce the audio signal.

5. A PCM audio signal recording circuit according to claim 1 wherein said means for detecting the difference detects a difference between a memory address on said memory means of the input digital signal to said memory means and a memory address on said memory means of the output digital signal from said memory means.

6. A PCM audio signal recording circuit according to claim 1, wherein said field frequency is a video field frequency, and said data field is defined by one data field formed of m blocks for a 625 lines/50 fields video signal and a 525 lines/60 fields video signal.

7. A PCM audio signal processing circuit for recording an audio signal on a recording medium, including memory means for storing a digital audio signal converted by sampling an analog audio signal with a predetermined sampling frequency (fs), means for encoding said digital audio signal into encoded data by adding an error detection/correction code to said digital audio signal, block-formatting means for distributing encoded data of said digital audio signal consecutive in time series on said recording medium by controlling a write address and read address of said memory means, modulation means for modulating an output signal of said block-formatting means into a modulated signal, and a rotary head type scanner for recording said modulated signal on a track formed on the recording medium wherein said head rotates with a rotation frequency not synchronously related to said sampling frequency.

said processing circuit comprising:

a detection circuit for detecting ratios of an input data amount of digital audio signal stored in said memory means and an output data amount of digital audio signal read from said memory means and written on the recording medium each period of a field frequency in synchronous relation to the rotation frequency of said rotary head type scanner and different from said rotation frequency; and a control circuit responsive to an output of said detection circuit for increasing or decreasing the output data amount of the digital audio signal to be read from said memory means and to be recorded on the recording medium in a subsequent period of the data field frequency.

8. In a PCM audio signal processing apparatus for processing an audio signal including a recording circuit for recording the audio signal on a recording medium having memory means for storing a digital audio signal converted memory means for storing a digital audio signal converted by sampling an analog audio signal with a predetermined sampling frequency (fs), means for encoding said digital audio signal into encoded data by adding an error detection/correction code to said digital audio signal, block-formatting means for distributing encoded data of said digital audio signal consecutive in time series on said recording medium by controlling a write address and read address of said memory means, modulation means for modulating an output signal of said block-formatting means into a modulated signal, and a rotary head type scanner, controlled by a field frequency of a video signal, for recording said modulated signal on a track formed on the recording medium wherein the head rotates with a rotation frequency not synchronously related to said sampling frequency, said recording circuit comprising:

a detection circuit for detecting ratios of an input data amount of digital audio signal stored in said memory means and an output data amount of digital audio signal read from said memory means and written on the recording medium each period of a data field frequency in synchronous relation to the rotation frequency of said rotary head type scanner and different from said rotation frequency; and a selection circuit for selecting one of at least two data fields in accordance with an output of said detection circuit for matching the video signal with the audio data signal, said data fields including an excess field ($N+\beta$ samples/field) having a larger number of data in one field and a diminish field (N−α samples/field) having a smaller number of data in one field relative to data amount of the digital audio signal in one data field in which data is recorded on the recording medium in a period of said data field frequency where N is a standard number of data, and α and β are integers different from each other.

9. A PCM audio signal processing apparatus according to claim 8, wherein said selection circuit operates to select said excess field in response to an output of said detection circuit indicating that the input data amount is larger than the output data amount.

10. A PCM audio signal processing apparatus according to claim 8, further comprising means for generating an identification signal of the selected data field and supplying the identification signal to said recording medium.

11. A PCM audio signal processing apparatus according to claim 10, a reproduction circuit for reproducing an audio signal from the recording medium comprising:
 a circuit for detecting the identification signal of the data field from said recording medium; and
 a circuit for controlling a digital audio signal picked up from said recording medium in accordance with the detected identification signal to reproduce the audio signal.

12. A PCM audio signal processing circuit for recording an audio signal on a recording medium, including memory means for storing a digital audio signal converted by sampling an analog audio signal with a predetermined sampling frequency (fs),
 means for encoding said digital audio signal into encoded data by adding an error detection/correction code to said digital audio signal, formatting means for distributing encoded data of said digital audio signal consecutive in time series on said recording medium by controlling a write address and read address of said memory means, modulation means for modulating an output signal of said formatting means into a modulated signal and a rotary head type scanner, controlled by a field frequency of a video signal, for recording said modulated signal on a track formed on the recording medium wherein the head rotates with a rotation frequency not synchronously related to said sampling frequency, said processing circuit comprising:
 a detection circuit for detecting ratios of an input data amount of digital audio signal stored in said memory means and an output data amount of digital audio signal read from said memory means and written on the recording medium each period of a data field frequency in a synchronous relation to the rotation frequency of said rotary head type scanner and different from said rotation frequency; and
 a selection circuit for selecting one of at least two data fields in accordance with an output of said detection circuit for matching the video signal with the audio data signal, said data fields including an excess field (N+β samples/field) having a larger number of data in one field and a diminish field (N−α samples/field) having a smaller number of data in one field relative to a data amount of the digital audio signal in one data field in which data are recorded on the recording medium in a period of said data field frequency, where N is a standard number of data, and α and β are integers different from each other. N+α and N−β are even numbers;
wherein said formatting means distributes the digital audio signal such that only odd ones or even ones of data of the digital audio signal consecutive in time series are contained in each data field.

* * * * *